United States Patent
Blackwood et al.

(10) Patent No.: US 11,003,997 B1
(45) Date of Patent: May 11, 2021

(54) MACHINE LEARNING MODELING USING SOCIAL GRAPH SIGNALS

(71) Applicant: Snap Inc., Santa Monica, CA (US)

(72) Inventors: John Cain Blackwood, Los Angeles, CA (US); Jason Brewer, Marina del Rey, CA (US); Nima Khajehnouri, Los Angeles, CA (US); Hadi Minooei, Irvine, CA (US); Benjamin C. Steele, Oak Park, CA (US); Qian You, Marina del Rey, CA (US)

(73) Assignee: Snap Inc., Santa Monica, CA (US)

( * ) Notice: Subject to any disclaimer, the term of this patent is extended or adjusted under 35 U.S.C. 154(b) by 830 days.

(21) Appl. No.: 15/725,075

(22) Filed: Oct. 4, 2017

Related U.S. Application Data

(60) Provisional application No. 62/535,588, filed on Jul. 21, 2017.

(51) Int. Cl.
*G06N 5/02* (2006.01)
*G06N 20/00* (2019.01)
*G06F 16/951* (2019.01)

(52) U.S. Cl.
CPC .......... *G06N 5/022* (2013.01); *G06F 16/951* (2019.01); *G06N 20/00* (2019.01)

(58) Field of Classification Search
CPC ....... G06N 5/022; G06N 20/00; G06F 16/951
See application file for complete search history.

(56) References Cited

U.S. PATENT DOCUMENTS

| | | | |
|---|---|---|---|
| 9,087,332 B2 * | 7/2015 | Bagherjeiran | G06Q 30/0269 |
| 9,361,322 B1 * | 6/2016 | Dutta | G06Q 30/00 |
| 2013/0124298 A1 * | 5/2013 | Li | G06Q 30/0241 |
| | | | 705/14.42 |
| 2014/0280237 A1 * | 9/2014 | Salkola | G06Q 50/01 |
| | | | 707/749 |

(Continued)

OTHER PUBLICATIONS

"About similar audiences on the Display Network", Google AdWords Display Network, [Online]. Retrieved from the Internet: <URL:https://support.google.com/adwords/answer/2676774?hk=en>, (accessed Jan. 5, 2018), 2 pgs.

(Continued)

*Primary Examiner* — Alan Chen
(74) *Attorney, Agent, or Firm* — Schwegman Lundberg & Woessner, P.A.

(57) ABSTRACT

Systems and methods are provided for receiving a request for lookalike data, the request for lookalike data comprising seed data and generating sample data from the seed data and from user data for a plurality of users, to use in a lookalike model training. The systems and methods further provide for capturing a snapshot of social graph data for a plurality of users and computing social graph features based on the seed data and the user data for the plurality of users, training a lookalike model based on the sample data and the computed social graph features to generate a trained lookalike model, generating a lookalike score for each user of the plurality of users in the user data using the trained lookalike model, and generating a list comprising a unique identifier for each user of the plurality of users and an associated lookalike score for each unique identifier.

20 Claims, 12 Drawing Sheets

(56) References Cited

U.S. PATENT DOCUMENTS

| | | | | |
|---|---|---|---|---|
| 2016/0171381 A1* | 6/2016 | Brewer | ................. | G06Q 50/01 |
| | | | | 706/11 |
| 2017/0099525 A1* | 4/2017 | Ray | .................... | G06Q 30/0275 |
| 2017/0140283 A1* | 5/2017 | Cheng | .................... | G06N 20/00 |
| 2017/0330220 A1* | 11/2017 | Korada | ................... | G06F 30/20 |
| 2018/0121550 A1* | 5/2018 | Jeon | ....................... | G06Q 50/01 |
| 2018/0336598 A1* | 11/2018 | Gross-Baser | .......... | G06N 20/00 |
| 2018/0349501 A1* | 12/2018 | Ramanath | ............. | G06N 20/00 |
| 2019/0034783 A1* | 1/2019 | Liu | .......................... | G06N 3/08 |
| 2019/0370270 A1* | 12/2019 | Rezaei | .............. | G06Q 30/0271 |

OTHER PUBLICATIONS

"Lookalike Audience", Facebook for developers: Marketing API, [Online]. Retrieved from the Internet: <URL:https://developers.facebook.com/docs/marketing-api/lookalike-audience-targeting/v2.6>, (accessed Jan. 5, 2018), 17 pgs.

"New targeting tools make Pinterest ads even more effective", Pinterest for Business, [Online]. Retrieved from the Internet:<URL:https://business.pinterest.com/en/blog/new-targeting-tools-make-pinterest-ads-even-more-effective>, (Jun. 14, 2016), 5 pgs.

"PageRank", Wikipedia, [Online]. Retrieved from the Internet: <URL:https://en.wikipedia.org/wiki/PageRank>, (accessed Jan. 5, 2018), 1-16.

Liu, Haishan, et al., "Audience Expansion for Online Social Network Advertising", KDD 2016, (Aug. 2016), 10 pgs.

\* cited by examiner

MACHINE LEARNING MODELING USING SOCIAL GRAPH SIGNALS

PRIORITY

This application claims the benefit of priority of U.S. Provisional Application Ser. No. 62/535,588, filed on Jul. 21, 2017, which is hereby incorporated by reference herein in its entirety.

BACKGROUND

Machine learning technology is being developed and utilized for a variety of use cases such as fraud prevention, healthcare trends for improving diagnoses and treatment, making transportation routes more efficient, analyzing sensor data to increase efficiency for utilities, personalizing user experiences online, and so forth. In particular, machine learning technology is starting to be utilized to help entities expand a particular audience for targeting content to users.

BRIEF DESCRIPTION OF THE DRAWINGS

Various ones of the appended drawings merely illustrate example embodiments of the present disclosure and should not be considered as limiting its scope.

DETAILED DESCRIPTION

Systems and methods described herein relate to machine learning technology for lookalike modeling to expand a list of users with desirable characteristics to a larger list of users which may have similar characteristics. For example, a car company may identify seven thousand profitable customers and want to target content to seven million people who are similar to the seven thousand profitable customers. Example embodiments utilize rich social network data to build and train a model to generate a list of similar users.

Example embodiments describe hybrid lookalike modeling systems and methods using social graph data to generate a larger group of lookalike users based on a seed segment. In one example, a server computer system may receive a request for lookalike data. The request for lookalike data may comprise seed data which the server computer system will use to generate an expanded list of users with desirable characteristics. The server computer system will generate sample data from the seed data and from user data for a plurality of users, to use in a lookalike model training. The user data for the plurality of users may be the users from which the server computer system will generate the expanded list of users with desirable characteristics. The server computer system may be associated with a messaging system or a social networking system.

The server computer system will capture a snapshot of social graph data for a plurality of users and compute social graph features based on the seed data and the user data for the plurality of users. The server computer system will train a lookalike model based on the sample data, user profile features for the plurality of users, and the computed social graph features to generate a trained lookalike model. The server computer system will generate a lookalike score for each user of the plurality of users in the user data using the trained lookalike model, and generate a list comprising a unique identifier for each user of the plurality of users and an associated lookalike score for a unique identifier. This list may be returned to the requester or used to provide content associated with the requester to users in the generated list.

Figure 1:
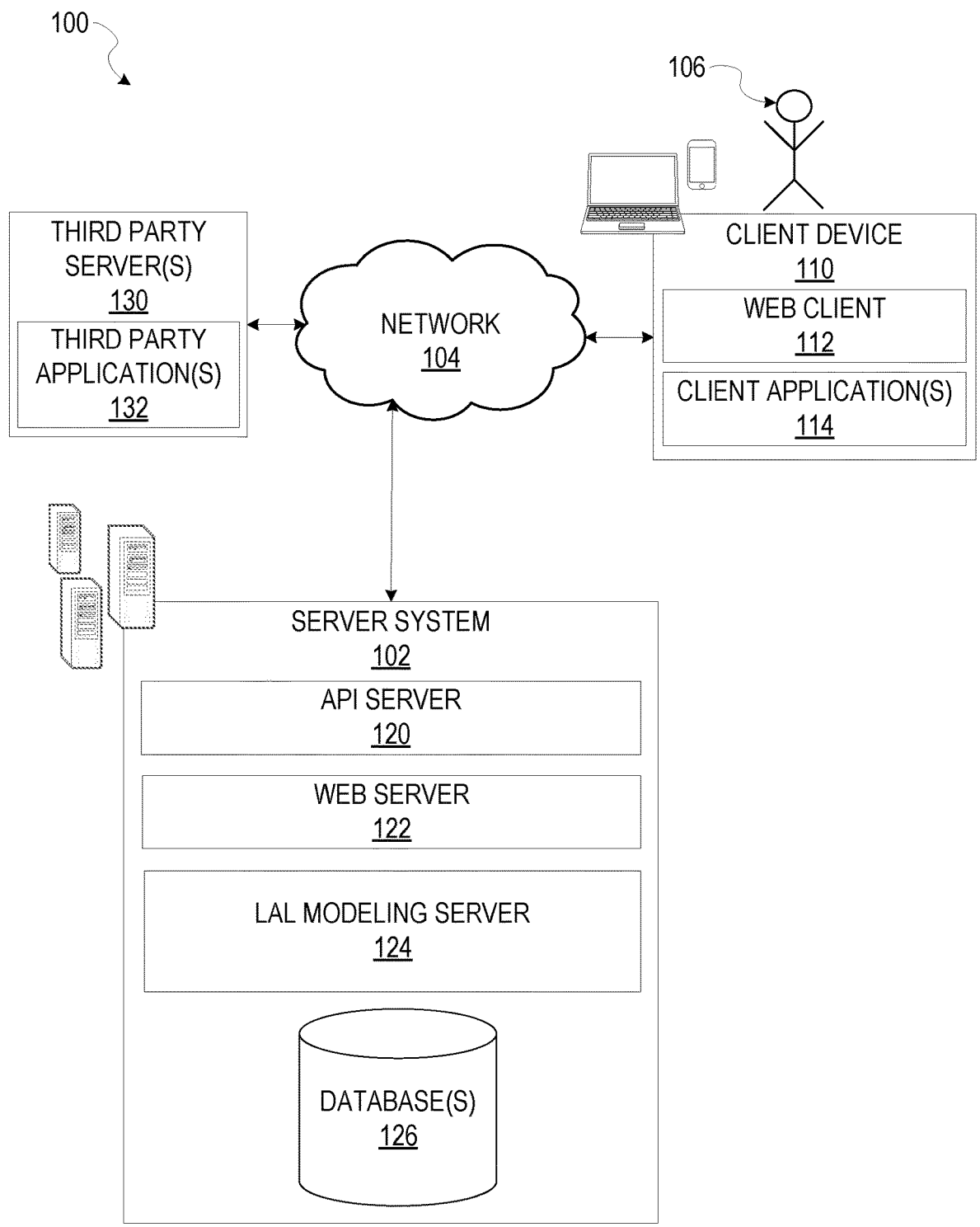
FIG. 1 is a block diagram illustrating a networked system, according to some example embodiments.

FIG. 1 is a block diagram illustrating a networked system 100, according to some example embodiments. The system 100 may include one or more client devices such as client device 110. The client device 110 may comprise, but is not limited to, a mobile phone, desktop computer, laptop, portable digital assistants (PDA), smart phone, tablet, Ultrabook, netbook, laptop, multi-processor system, microprocessor-based or programmable consumer electronic, game console, set-top box, computer in a vehicle, or any other communication device that a user may utilize to access the networked system 100. In some embodiments, the client device 110 may comprise a display module (not shown) to display information (e.g., in the form of user interfaces). In further embodiments, the client device 110 may comprise one or more of touch screens, accelerometers, gyroscopes, cameras, microphones, global positioning system (GPS) devices, and so forth. The client device 110 may be a device of a user that is used to create or generate queries.

One or more users 106 may be a person, a machine, or other means of interacting with the client device 110. In example embodiments, the user 106 may not be part of the system 100, but may interact with the system 100 via the client device 110 or other means. For instance, the user 106 may provide input (e.g., touch screen input or alphanumeric input) to the client device 110, and the input may be communicated to other entities in the system 100 (e.g., third party servers 130, server system 102, etc.) via the network 104. In this instance, the other entities in the system 100, in response to receiving the input from the user 106, may communicate information to the client device 110 via the network 104 to be presented to the user 106. In this way, the user 106 may interact with the various entities in the system 100 using the client device 110.

The system 100 may further include a network 104. One or more portions of network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the public switched telephone network (PSTN), a cellular telephone network, a wireless network, a WiFi network, a WiMax network, another type of network, or a combination of two or more such networks.

The client device 110 may access the various data and applications provided by other entities in the system 100 via web client 112 (e.g., a browser, such as the Internet Explorer® browser developed by Microsoft® Corporation of Redmond, Wash. State) or one or more client applications 114. The client device 110 may include one or more client applications 114 (also referred to as "apps") such as, but not limited to, a web browser, messaging application, electronic mail (email) application, an e-commerce site application, a mapping or location application, and the like.

In some embodiments, one or more client applications 114 may be included in a given one of the client devices 110, and configured to locally provide the user interface and at least some of the functionalities, with the client application 114 configured to communicate with other entities in the system 100 (e.g., third party servers 130, server system 102, etc.), on an as needed basis, for data and/or processing capabilities not locally available (e.g., to process user queries, to authenticate a user 106, to verify a method of payment, etc.). Conversely, one or more applications 114 may not be included in the client device 110, and then the client device 110 may use its web browser to access the one or more applications hosted on other entities in the system 100 (e.g., third party servers 130, server system 102, etc.).

A server system 102 may provide server-side functionality via the network 104 (e.g., the Internet or wide area network (WAN)) to one or more third party servers 130 and/or one or more client devices 110. The server system 102 may include an application program interface (API) server 120, a web server 122, and a lookalike (LAL) modeling server 124, which may be communicatively coupled with one or more databases 126.

The one or more databases 126 may be storage devices that store lookalike modeling data, user data, social graph data, seed data, and other data. The one or more databases 126 may further store information related to third party servers 130, third party applications 132, client devices 110, client applications 114, users 106, and so forth. The one or more databases 126 may include cloud-based storage.

The server system 102 may be a cloud computing environment, according to some example embodiments. The server system 102, and any servers associated with the server system 102, may be associated with a cloud-based application, in one example embodiment.

The lookalike modeling server 124 may provide back-end support for third-party applications 132 and client applications 114, which may include cloud-based applications. In one embodiment, the lookalike modeling server 124 may receive requests from third party servers or client devices, process the requests to generate lookalike models, generate responses to the requests, and so forth.

The system 100 may further include one or more third party servers 130. The one or more third party servers 130 may include one or more third party application(s) 132. The one or more third party application(s) 132, executing on third party server(s) 130, may interact with the server system 102 via API server 120 via a programmatic interface provided by the API server 120. For example, one or more the third party applications 132 may request and utilize information from the server system 102 via the API server 120 to support one or more features or functions on a website hosted by the third party or an application hosted by the third party. The third party website or application 132, for example, may provide functionality that is supported by relevant functionality and data in the server system 102.

Figure 2:
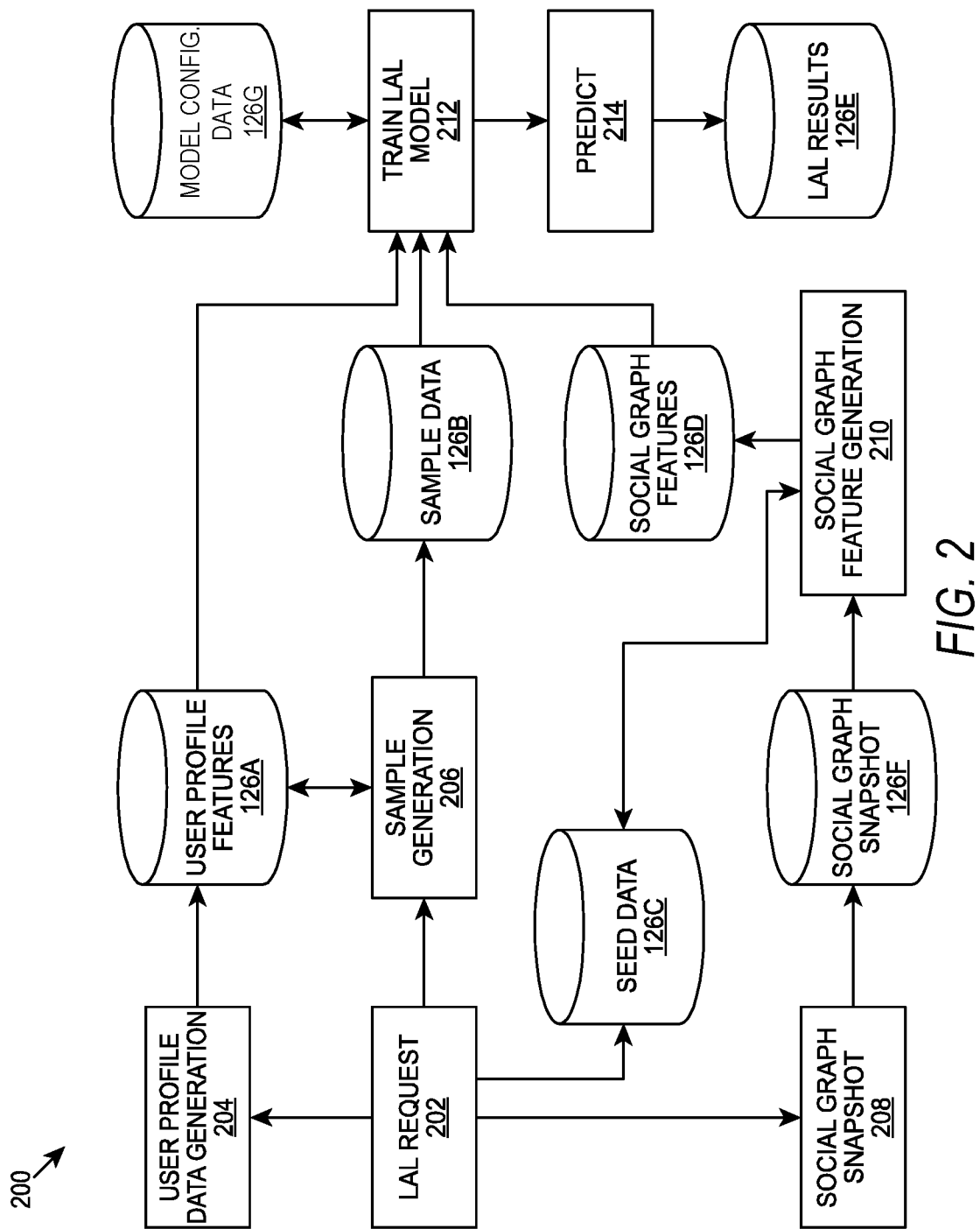
FIG. 2 is a block diagram illustrating a hybrid learning model, according to some example embodiments.

FIG. 2 is a block diagram illustrating a hybrid learning modeling system 200, according to some example embodiments. The hybrid learning modeling system 200 shown in FIG. 2 incorporates additional social graph induced features (also referred to as social network features) with a seed segment into a lookalike model. The social graph induced features are used as training data to compute new features in the lookalike model and then used as part of the lookalike model. The social graph induced features are a set of features that are computed with respect to seed users (e.g., training data) per lookalike segment (e.g., seed data), and are based on or rely upon the social graph structure.

There are a number of aspects that separate social graph features from commonly used features in models. For example, features used in machine learning models are typically trying to capture similarity of users' interests or behaviors to each other, whereas the social graph induced features are trying to capture the influence of users over each other. Moreover, some features may encapsulate both interest and/or behavior as well as influence over others. Additionally, the canonical features used in machine learning models are usually universal in the sense that the same feature for the same user can be used in other machine learning models and campaigns as long it is needed and it is oblivious of training data. This is despite the fact that some feature values may be stale or expired and should be refreshed after a certain period of time. Social graph induced features, on the other hand, are computed based on the training data (e.g., seed users) and differ for each run of the machine learning model.

Social graph induced features may include features measuring a user's structural position in a social graph with respect to the seed users, such as, for instance, the (e.g., normalized) number of links (e.g., friendship or followership or followeeship) of a user to the seed users. The social graph induced features can be any other graph structural property or measure based on graph entities such as cliques, bridges, (directed) paths, and so forth.

Social graph induced features measure the influence or engagement of seed users on users given the social graph structure and dynamics (e.g., the number/time-length of media collections or messages of seed users viewed, received by, or sent to a user). The social graph induced features are computed for each user and the additional features are added to a feature vector. The new feature vector is used to train the lookalike model. The lookalike model thus not only captures the users engagement with organic content and ad content, but also captures the users' social interactions with the seed users.

In one example, the hybrid learning modeling system 200 is part of the server system 102. For example, in the server system 102, the hybrid learning modeling system 200 may be executed by the LAL modeling server 124. While the LAL modeling server 124 is shown as one server in FIG. 1, it is understood that the LAL modeling server 124 may comprise multiple servers, processors, or other computing devices. Accordingly, the hybrid learning modeling system 200 may be implemented and executed using one or more computing devices or processors. Moreover, various databases are shown in FIG. 2, however, it is understood that various data described herein may be stored in a single database or in multiple databases, or other form of data stores.

The system 200 includes a lookalike (LAL) request module 202 configured to receive a lookalike request from a computing device. For example, the LAL request module 202 may receive a plurality of LAL requests from a plurality of computing devices associated with third party entities (e.g., via third party servers 130) or via client devices 110. The LAL request may comprise various information. In one example, the LAL request comprises seed data. The LAL request module 202 stores seed data included in the request in one or more databases 126C. The LAL request module 202 communicates with a user profile data generation module 204, a sample generation module 206, and a social graph snapshot module 208.

The user profile data generation module 204 processes user profile data to generate user profile features, which are stored in one or more databases 126A. The sample generation module 206 generates sample data from seed data stored in database 126C and from user data, as described below. The social graph snapshot module 208 captures a current snapshot of social graph data and stores the snapshot of social graph data in one or more databases 126F. The social graph feature generation module 210 generates features using the seed data and social graph snapshot data and stores the social graph features in one or more databases 126D.

The train LAL model module 212 utilizes model configuration data 126G to determine which machine learning model(s), of a plurality of machine learning models, to use to train the LAL model. Examples of machine learning models include supervised learning models such as logistic regression and tree-based modeling, a form of hybrid learning modeling, and other machine learning models. For example, the train LAL model module 212 may determine, based on the request, based on a default model, or other factor(s), which machine learning model or combination of machine learning models should be utilized to train the LAL model and to process the request.

The train LAL model module 212 may utilize various data to train the LAL model, such as user profile features, sample data, social graph features, and so forth. The trained LAL model is then used by the predict module 214 to generate LAL results for the request, and the LAL results may be stored in one or more databases 126E.

Figure 3:
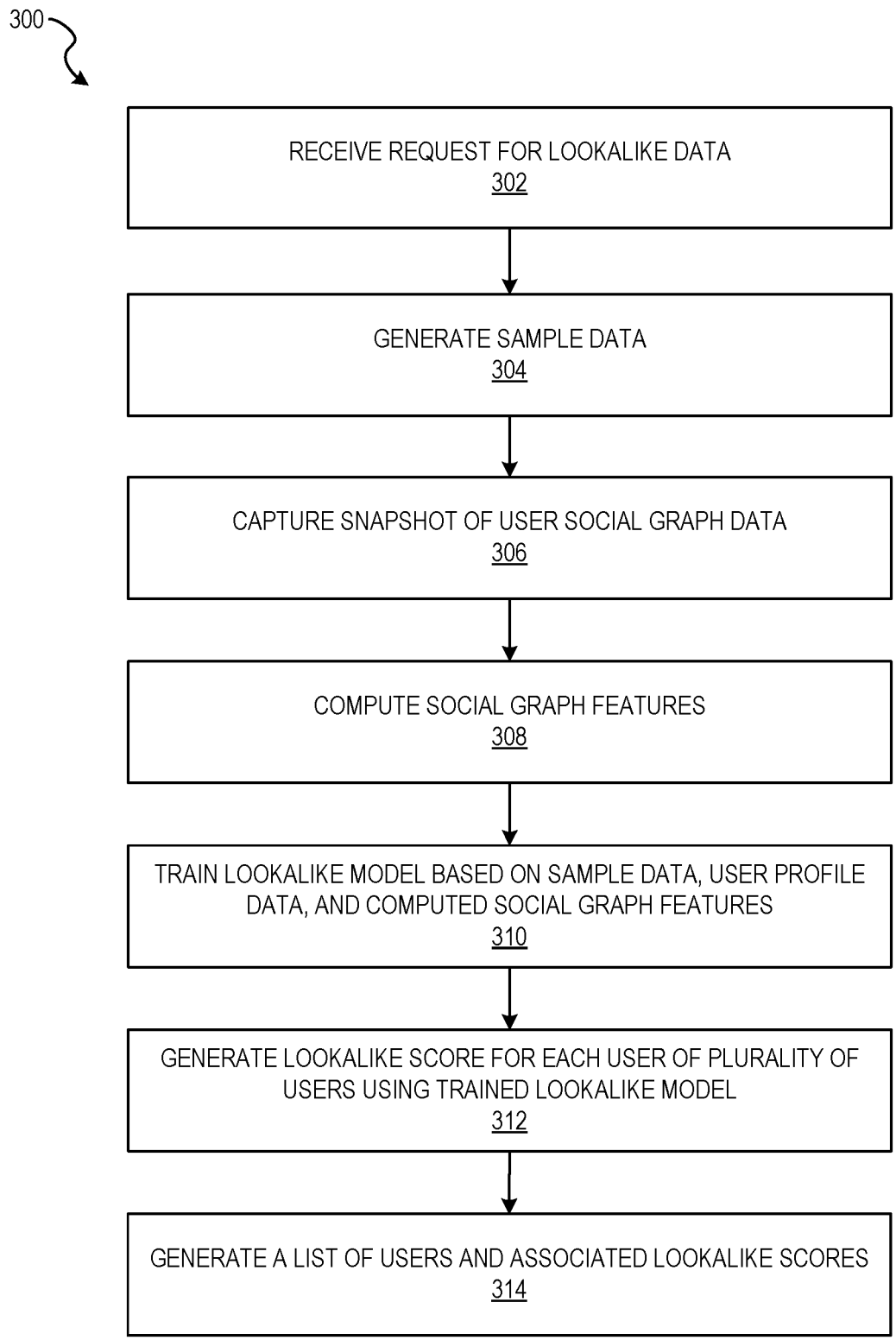
FIG. 3 is a flow chart illustrating aspects of a method, according to some example embodiments, for processing a lookalike request.

FIG. 3 is a flow chart illustrating aspects of a method 300, according to some example embodiments, for processing an LAL request. For illustrative purposes, method 300 is described with respect to the networked system 100 of FIG. 1 and the block diagram of FIG. 2. It is to be understood that method 300 may be practiced with other system configurations in other embodiments.

In operation 302, a server computer system (e.g., server system 102 via LAL modeling server 124 and LAL request module 202), receives a request for lookalike data. The server computer system may receive the request via API server 120, web server 122, or directly via LAL modeling server 124. For example, a client device 110 associated with an entity (e.g., company, organization, individual, etc.) may send the request to the server system 102 directly or via a third party server 130.

The request may include various information. In one example, the request comprises seed data that comprises at least a plurality of user identifiers. The plurality of user identifiers may represent users with desirable characteristics and will be used to expand to a larger list of users which may have similar characteristics. Some examples of user identifiers may include email addresses, mobile phone numbers, or other means to uniquely identify a particular user. A user may have more than one user identifier.

The request may comprise other information, such as a size for the lookalike data. For example, the request may include a small size to get a very targeted number of similar users (e.g., 500, 1000, etc.), a larger size to get a larger amount of users (e.g., 10,000, 5 million, etc.), and so forth. The request may also include filtering parameters, to be used for filtering out certain users based on particular characteristics. For example, a car company may want to filter out users under a certain age (e.g., under 21, under 30, etc.) or may want to filter out users who have recently purchased a car, and so forth. The request may also comprise particular campaign goals of the entity, or other metrics or optimization goals.

After receiving the request, the server computer system may store the data from the request in one or more databases 126. For example, the server computer system may store the seed data in seed data database 126C. The server computer system may store the seed data as it was received, or it may perform some processing on the data. For example, the server computer system may have access to user data for a plurality of users. In one example, the server computer system has user data stored in one or more database 126 from users of the server system 102. In another example, the server computer system accesses user data for a plurality of users from third party sources of data. In yet another example, the server computer system may access and/or store user data from users of the server system 102 and user data from one or more third party sources of data. The server computer system may compare the seed data received in the request for lookalike data to the user data for the plurality of users, to determine which users in the seed data are also users in the user data (e.g., to determine which users in the seed data match users in the user data). The server computer system may only store the users of the seed data that match users in the user data in the seed data database 126C to use in processing the request for lookalike data (e.g., the users in the seed data that are not matched to users in the user data may be discarded). The server computer system would accordingly use the subset of the original seed data that is stored in the seed data database 126C in training the model and processing the request.

The server computer system may utilize user profile data in processing the lookalike request. For example, the server computer system may capture a snapshot of user profile data for a plurality of users, for a particular point in time (e.g., a point in time upon receiving the request for lookalike data, or before or after receiving the request for lookalike data). The server computer system may process user profile data to generate user profile features for each user. The server computer system may store the user profile features in one or more databases 126A.

Some examples of user profile features may include demographics such as age, gender, education level, income level, marital status, occupation, number of children, and so forth. Other user profile features may include activities associated with the user, such as engagement with different social network channels, messaging activities, image capturing activities (e.g., photos and video), ad engagement, organic content engagement, interest groups, and so forth. Yet other features may include location, user preferences, and the like. There may be just a few features of interest to the system or a request, or there may be hundreds of user features of interest or relevant to the request. A list of relevant features may be predetermined by the server computer system, or may be determined from the request for the lookalike data. Each user may have different values for each feature. Since many of these user features may not change (e.g., age, gender) or change as frequently (e.g., occupation, education level), computing user profile features may not need to be recomputed for each request for lookalike data.

In operation 304, the server computer system generates sample data. For example, the server computer system may generate sample data from the seed data and from the user data for the plurality of users, to use in lookalike model training. The sample data may include a positive data sample (e.g., positive training data) and a negative data sample (e.g., negative training data). The positive data sample may be generated from the seed data. For example, the positive data sample may comprise all of the seed data or a subset of the seed data. The negative data sample may be generated from user data of the plurality of users.

In one example, a random sample of users (e.g., excluding users from the sample data) may be generated as the negative data sample. In another example, negative sample data may be generated from the user data of the plurality of users based on certain criteria or factors (e.g., the user does not like the products sold by the entity associated with the requester, etc.). Other methods for generating negative sample data may be used in addition, or in the alternative. In one example, the negative data sample may be the same size as the positive data sample.

In operation 306, the server computer system captures a snapshot of social graph data for the plurality of users. The social graph data may be data generated by the server system 102 (e.g., the server system 102 may comprise a social networking system, messaging system, etc.) and/or the social graph data may be generated by a third party and accessed by the server system 102. Social graph data may comprise a graph for each user. The graph for each user comprises other users, to which each user is connected, and how they are connected (e.g., directly related as friends, a friend of a friend, etc.). Social graph data may further comprise data such as which other users each user is following, which other users are following a particular user, how many times a user reads another user's messages or views another user's media collections (e.g., stories or galleries), which users have collaborated on the same media collection, and so forth. Since connections and interactions with other uses are constantly changing, a snapshot of the social graph data for the plurality of users for a given timeframe is captured to use in computing and generating social graph features. The snapshot of the social graph may be stored in one or more databases 126F.

In operation 308, the server computer system computes social graph features based on the seed data and the user data for the plurality of users. Since the social graph features change constantly (e.g., new connections added or deleted, new interactions with connections are constantly occurring, etc.), the social graph features may be captured and computed for each lookalike request.

To compute social graph features, the server computer system may analyze the social graph data (e.g., snapshot of social graph) to determine connections between users in the user data and seed users (e.g., how is a particular user connected to one or more seed user), interactions between users and seed users, and so forth. For example, one user may have connections to three seed users, a second user may be following two stories for a particular seed user, a third user may have no connections to any of the seed users, a fourth user may have similar interests to several of the seed users, and so forth. From this analysis, the server computer system determines additional features to be used in training the lookalike model, and determines values for each feature for each user of the plurality of users.

Using a simple example, social graph features may include a first feature (f1) number_of_one_hop_folloees_in_seeds, a second feature (f2) log(number_of_two_hop_folloees_in_seeds) and a third feature (f3) number_of_5_clique_friends_involving_current_user_and_seeds. For user u:
number_of_one_hop_folloees_in_seeds:=Number of seeds that u is following.
log(number_of_two_hop_folloees_in_seeds):=log of the number of seeds that are followed by u indirectly (e.g., if S is the set of users that u is following, and T the set of seeds that have at least one follower in S, then this feature value is the size of T). It is noted that that in general computing features may need some caution when computed for seeds themselves to avoid biasness towards seed users.
number_of_5_clique_friends_involving_current_user_and_seeds:=number of groups of 5 (u and 4 other seeds) that are all friends of each other Thus, for users A, B, C example values of (f1, f2, f3) may include:
A: (5, 2.67, 5)
B: (21, 4.4, 3)
C: (0, 0.32, 0)

In operation 310, the server computer system trains a lookalike model based on the sample data, the user profile features for the plurality of users, and the computed social graph features to generate a trained lookalike model. The lookalike model may be trained based on modeling data, as explained above, to calculate the weights or coefficients for each feature. This calculation is then saved as the trained lookalike model.

In operation 312, the server computer system generates a lookalike score for each user of the plurality of users in the user data using the trained lookalike model. For example, for each user of the plurality of users, the server computer system uses the trained lookalike model to analyze the values for each of the features associated with the user and generate a score (e.g., between 0 and 1) using the calculated weights or coefficients for each feature.

In operation 314, the server computer system generates a list comprising a unique identifier for each user of the plurality of users and an associated lookalike score (e.g., between 0 and 1) for each unique identifier.

After generating the list of users and associated lookalike scores, the list may be further culled based on exclusions or constraints from the entity associated with the request. For example, the request may also comprise exclusions, constraints, as explained above, and these may be used to filter the list further to generate a final list of users and associated lookalike scores. If the request comprised a size of the final list desired by the requester (or if a size is predetermined or determined by other means), the list may be culled to generate a subset list of the users with the top lookalike scores of the size of the final list desired.

The list may then be returned to the requester to be used by the requester, or the list may be used by the server system 102 to present content from the requester. For example, the server system 102 may receive content from the requester (e.g., a media collection, an ad, a media overlay, etc.) and the server system 102 may display the content to one or more users of the plurality of users based on the generated list. For example, a user may be using a social networking or messaging system and the user may be associated with a unique identifier in the generated list. The server system 102 may display the content from the requester to the user during the user's use of the social networking system or messaging system.

Figure 4:
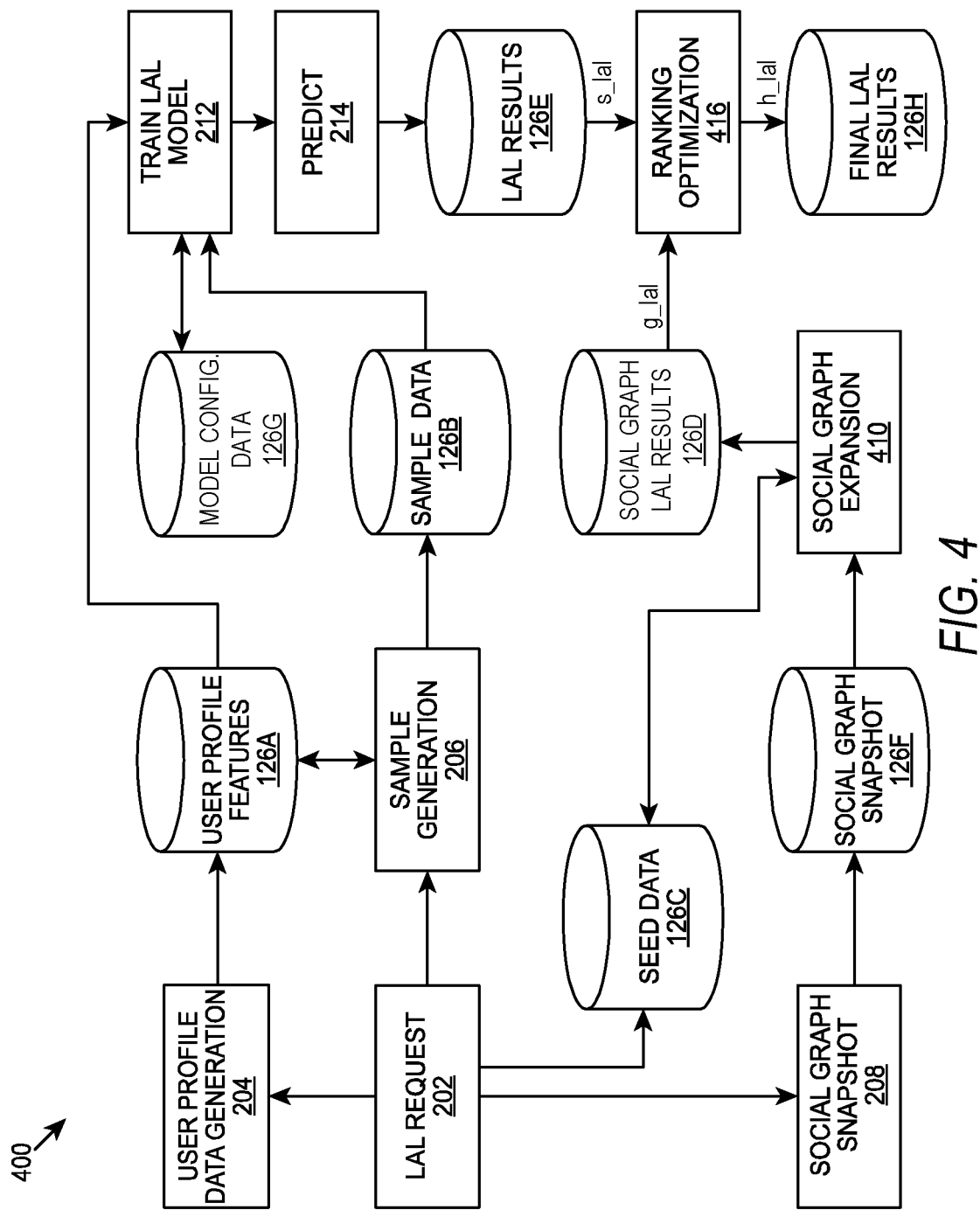
FIG. 4 is a block diagram illustrating a hybrid learning model, according to some example embodiments.

FIG. 4 is a block diagram illustrating another hybrid learning modeling system 400, according to some example embodiments. The system 400 shown in FIG. 4 combines lookalike results generated from a trained model using sample data and user profile features, with a social graph approach. The idea is that if a user appears in both the lookalike results and social graph lookalike results, the user is a good candidate for a final lookalike result. Thus, the user's lookalike score from the trained model using sample data and user profile features is combined with the user's lookalike score from the social graph approach, and then ranking optimization is used to generate final lookalike results. In one example, the high-level steps include (1) computing each user's lookalike score (s_lal) using a trained model using sample data and user profile features (e.g., logistic regression probability), (2) computing each user's social graph lookalike model score (g_lal), for example, computed as a score for the seed data in a page rank method, further modifying the score by users' interaction with seeds (e.g., followee, messages sent, stories viewed, etc.), or another method, and (3) re-ranking users by combining s_lal and g_lal into h_lal, which is the final score.

To produce h_lal the server computer system solves for the parameters w1 and w2, such that a predetermined business metric (e.g., retrospective offline install rate or cost per install) is optimized:

argmax_w1_w2 predefined_objectives(users sort by (w1*s_lal+w2*g_lal))

This means that the final w1 and w2 will produce the largest predefined objective value. Typically this kind of ranking optimization does not have close form solutions, so the w1 and w2 may be solved with the following example approaches: (1) grid search in the space of w1 and w1, (2) simplex method or Nelder-Mead optimization in searching the space of w1 and w2, (3) learning to rank method, which in particular solves for an optimal ranking with respect to objective functions (and this method can take w1 and w2 as two degrees of freedom), or (4) another approach.

The system 400 in FIG. 4 has several modules and databases that have been explained above with respect to system 200 in FIG. 2. Since the same description from FIG. 2 applies to the similarly numbered modules and data structures in FIG. 4, these similarly numbered items will not be described again here.

FIG. 4 also comprises a social graph expansion module 410. The social graph expansion module 410 determines a predetermined feature or features to use to compare users in user data for a plurality of users to users in the seed data. Each user is scored based on how strong the feature(s) for the user relates to the feature(s) for one or more seed users. This score (e.g., g_lal) is stored in one or more databases 126D.

The ranking optimization module 416 provides functionality to merge the social graph LAL results (e.g., g_lal) and the LAL results (e.g., s_lal) in a way to maximize (or optimize) the number of users who will have the most desirable characteristics. The result is a final LAL score (h_lal) for each user which is stored in one or more databases 126H.

Figure 5:
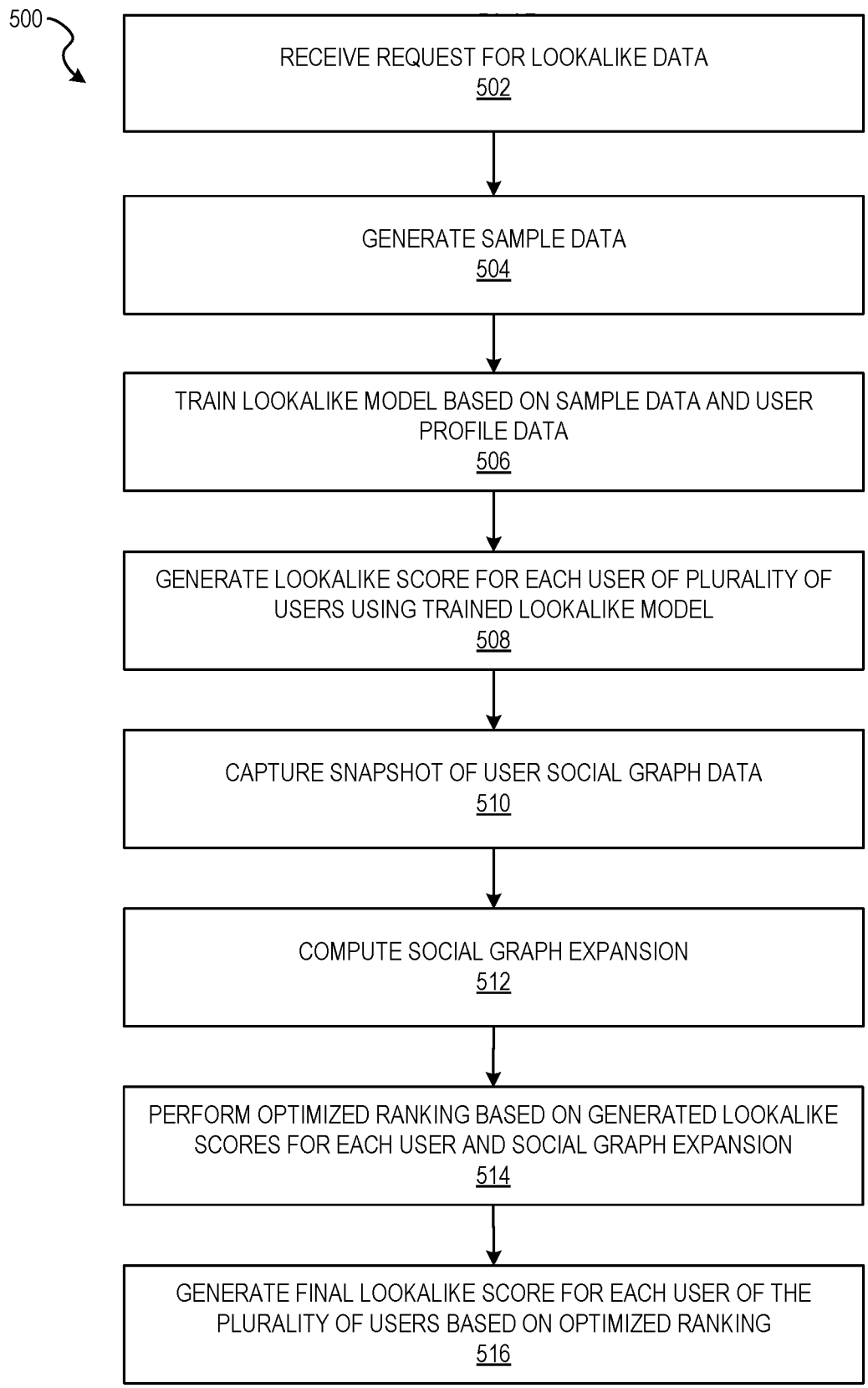
FIG. 5 is a flow chart illustrating aspects of a method, according to some example embodiments, for processing a lookalike request.

FIG. 5 is a flow chart illustrating aspects of a method 500, according to some example embodiments, for processing a LAL request. For illustrative purposes, method 500 is described with respect to the networked system 100 of FIG. 1 and the block diagram of FIG. 4. It is to be understood that method 500 may be practiced with other system configurations in other embodiments.

In operation 502, a server computer system (e.g., server system 102 via LAL modeling server and LAL request module 202), receives a request for lookalike data, as described above with respect to operation 302 of FIG. 3. In operation 504, the server computer system generates sample data, as explained above with respect to operation 304 of FIG. 3. In operation 506, the server computer system trains a lookalike model based on the sample data and, the user profile features for the plurality of users, to generate a trained lookalike model, as explained above with respect to operation 310 of FIG. 3. In operation 508, the server computer system generates a lookalike score, for each user of the plurality of users, using the trained lookalike model, as explained above in respect to operation 312 of FIG. 3.

In operation 510, the server computer system captures a snapshot of user social graph data, as explained above with respect to operation 306 of FIG. 3. In operation 512 the server computer system uses the snapshot of the user social graph data to compute a social graph expansion. For example, the server computer system determines a predetermined feature or features to use to compare users in user data for a plurality of users to users in the seed data, using the snapshot of user social graph data. A feature may be any sort of connection that can be established between two individuals or users. Some example features include, the number of times a user views another user's stories or media collections, whether or not a user collaborates with another user for a story or media collection, how many connections, such as friends, a user has in common with a seed user, how many connections the seed users are away from a particular user or other connections associated with the user or seed users, how many times a user appears in the same location as a seed user, whether the user is a follower of the seed user or the seed user's stories or media collections, how many times a user repeatedly views a story or media collection of a seed user, whether the user shared any media content with a seed user or vice versa, how long a user viewed a story or media collection of a seed user, what percent of seed user stories or media collections a user viewed (e.g., 8 out of 10, 2 out of 10, etc.), and the like.

The server computer system scores each user of the plurality of users based on how strong the feature(s) for each user relates to the feature(s) for one or more seed users. For example, the server computer system compares each user of the plurality of users to each user of the seed users to determine a value for each feature based on the feature and connectivity related to the users and feature (e.g., a score of the relationships of each user of the plurality of users compared to each user of the seed users). For example, user A of the plurality of users is compared to user B of the seed users to determine whether they are in each other's social graph and how many connections they are away in the social graphs. This score (e.g., g_lal) is stored in one or more databases 126D.

Using a simple example of connections between the users of the plurality of users and the seed users, there may be a seed user A and a seed user B in the seed users. There may be users 1-10 in the plurality of users. Seed user A may have connections with users 1 and 2, and seed user B may have connections with users 1, 2, and 7. In this example, user 1 gets a score of 2 because user 1 has connections with 2 seed users (e.g., seed user A and seed user B), user 2 gets a score of 2 because user 2 has connections with 2 seed users (e.g., seed user A and seed user B), and user 7 gets a score of 1 because user 7 has a connection with 1 seed user (e.g., seed user B), and the rest of the users 3-6 and 8-10 get a score of 0 because they have no connections with any seed users. The score may further reflect how far away the connections are (e.g., direct connection, two friends away, ten friends away, etc.) and other criteria. As explained above, there are various other features that may be used, including how often the user chats or sends messages with one or more seed users, how many seed users the user collaborates with on a story or media collection, how many seed user stories or media collections has the user viewed, and so forth. All of the predetermined features may be used to determine the final social graph score for each user of the plurality of users (e.g., social graph LAL results).

In operation 514, the server computer system analyzes the LAL results (e.g., the s_lal scores) and the social graph LAL results (e.g., the g_lal scores) to perform optimized ranking of the users of the plurality of users based on the generated lookalike scores for each user and the social graph expansion scores for each user. For example, the server computer system merges the s_lal scores and the g_lal scores to combine the scores in such a way to maximize the number of users who will comprise the desired characteristics. In one example, the server computer system may use a weighted sum to perform this calculation.

In operation 516, the server computer system generates a final lookalike score for each user of the plurality of users based on the optimized ranking. As explained above, after generating the list of users and associated lookalike scores, the list may be further culled based on exclusions or constraints from the entity associated with the request. For example, the request may also comprise exclusions, constraints, as explained above, and these may be used to filter the list further to generate a final list of users and associated lookalike scores. If the request comprised a size of the final list desired by the requester (or if a size is predetermined or determined by other means), the list may be culled to generate a subset list of the users with the top lookalike scores of the size of the final list desired.

The list may then be returned to the requester to be used by the requester, or the list may be used by the server system 102 to present content from the requester. For example, the server system 102 may receive content from the requester (e.g., a media collection, an ad, a media overlay, etc.) and the server system 102 may display the content to one or more users of the plurality of users based on the generated list. For example, a user may be using a social networking or messaging system and the user may be associated with a unique identifier in the generated list. The server system 102 may display the content from the requester to the user during the user's use of the social networking system or messaging system.

In another example embodiment, another hybrid approach integrating both LAL results (e.g., capturing similarity in user content engagement) and social graph data (e.g., similarity from influence and homophily) may be used. This approach may be built on top of state-of-the-art label propagation.

Label propagation, in general, tries to label the data points near the labeled points with similar labels. A label propagation in a social graph lookalike tries to label users which can be traced back to seeds through a social graph as "seeds," and hence can include those users into a lookalike segment. But since we already have supervised learning lookalike segment and the lookalike score s_lal (also referred to as a "supervised learning lookalike score"), the lookalike score may be incorporated as a degree of stochasticness when propagating the label. Example pseudocode for this example embodiment comprises:

total_two_hop_score=0
propogation_probabilty=0
for each user ui:
   h_lal(ui)=0 # initialize ui's final score to 0
   for each seed si:
     two_hop_score=(# two hop paths from si to ui in friends graph)/# friends of si
     total_two_hop_score=total_two_hop_score+two_hop_score
     propogation_probability=s_lal(ui) # ui's supervised learning lookalike score
     val=uniform(0,1) # generate a random variable from uniform distribution from 0 to 1
     if val<=propogation_probability:
     h_lal(ui)=total_two_hop_score # allow propagation
sort all users based on h_lal(user)
take top X as hybrid lookalike segment As shown in the above example pseudocode, the stochastic label propagation approach can be viewed as a probabilistic version rank.

Figure 6:
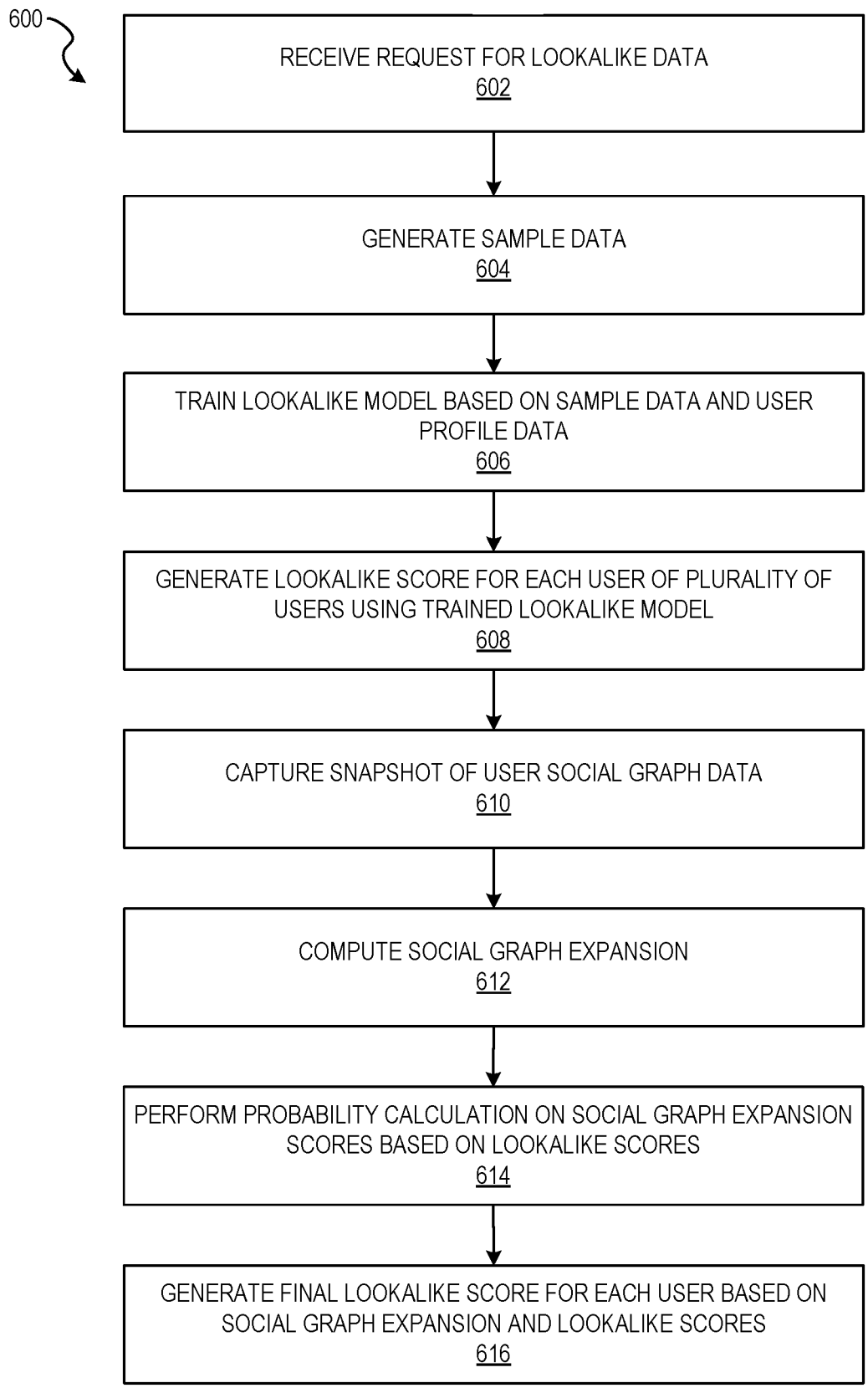
FIG. 6 is a flow chart illustrating aspects of a method, according to some example embodiments, for processing a lookalike request.

FIG. 6 is a flow chart illustrating aspects of a method 600, according to some example embodiments, for processing a LAL request. For illustrative purposes, method 600 is described with respect to the networked system 100 of FIG. 1 and the block diagram of FIG. 4. It is to be understood that method 600 may be practiced with other system configurations in other embodiments.

Operations 602-612 are the same as the operations 502-512 of FIG. 5 and are explained above with respect to operations 502-512. In operation 614, the server computer system performs a probability calculation on social graph expansion scores (e.g., social graph LAL results (g_lal) stored in one or more databases 126D) using lookalike scores (e.g., LAL results (s_lal) stored in one or more databases 126E). For example, for each user in the social graph LAL results, the server computer system uses the computed lookalike score (e.g., a number between 0-1) to determine the probability that the user in the social graph lookalike expansion will be included or eliminated from the final LAL results. In one example, the server computer system uses a uniform number generator to randomly generate a number to indicate whether or not the user should be included or eliminated from the final LAL results.

For example, a user A may have a social graph score (g_lal) of 500 and a lookalike score (s_lal) of 0.1, a user B may have a social graph score of 300 and a lookalike score 0.5, and a user C may have a social graph score of 200 and a lookalike score of 0.4. Based on these scores, user A has a 0.1 (e.g., 10%) probability of being included in the final LAL results, user B has a 0.5 (e.g., 50%) probability of being included in the final LAL results, and user C has a 0.4 (e.g., 40%) probability of being included in the final LAL results.

Based on the results of the probability calculation, the server computer system determines whether or not the user is included or eliminated. If the user is included, the user's social graph score (e.g., g_lal) is the score calculated based on the social graph snapshot data. If the user is to be eliminated, the user's social graph score is set to zero or the user is removed from the list of users.

In operation 616, the server computer system generates a final lookalike score for each user of the plurality of users based on the social graph LAL results (e.g., g_lal) and the LAL results (s_lal). For example, the server computer system may generate the final lookalike score for each user by performing optimized ranking as explained above or by other methods for combining or merging the scores.

As explained above, after the list of users and associated lookalike scores is generated, the list may be further culled based on exclusions or constraints from the entity associated with the request. For example, the request may also comprise exclusions, constraints, as explained above, and these may be used to filter the list further to generate a final list of users and associated lookalike scores. If the request comprised a size of the final list desired by the requester (or if a size is predetermined or determined by other means), the list may be culled to generate a subset list of the users with the top lookalike scores of the size of the final list desired.

The list may then be returned to the requester to be used by the requester, or the list may be used by the server system 102 to present content from the requester. For example, the server system 102 may receive content from the requester (e.g., a media collection, an ad, a media overlay, etc.) and the server system 102 may display the content to one or more users of the plurality of users based on the generated list. For example, a user may be using a social networking or messaging system and the user may be associated with a unique identifier in the generated list. The server system 102 may display the content from the requester to the user during the user's use of the social networking system or messaging system.

The above examples describe ranking users by lookalike scores. In other examples, content may be ranked for each user. For example, a social networking system or messaging system may provide various channels of content (e.g., 10 channels, 26 channels, etc.). For each channel a lookalike model could be built and then run for each user. The channels would be ranked in order for each user to determine which content should appear first to the user (e.g., first in a plurality of content in a social networking or messaging system user interface on a computing device).

In one example, the lookalike model is built for each channel based on all users in a particular time period (e.g., one week, one month, one year) that viewed that channel at a particular frequency (e.g., every day, every other day, every week, etc.). The model may further be built based on a duration of time that the user viewed the channel (e.g., for more than a predetermined amount of time such as a minute, five minutes, ten minutes, etc.).

For example, there may be a Cosmopolitan channel and a CNN channel. A lookalike model may be built for the Cosmopolitan channel based on all the users in the last six months that viewed the Cosmopolitan channel at least once every day. Similarly, a lookalike model may be built for the CNN channel. The lookalike model for each channel is used to score all of the other users in the system (or a set of users for which a score is desired). Thus, the system would generate a lookalike score for each user for each channel for how likely they are to view each channel. For example, a user may have a 0.1 score for CNN and a 0.5 score for Cosmopolitan. The system can rank the scores for each user to generate an order to display the channels on a user computing device. In the example above, the CNN channel would appear first and the Cosmopolitan channel would appear second for the user.

As explained above, the server system 102 of FIG. 1 may be associated with a messaging system or social networking system. For example, the server system 102 may be a messaging system or social networking system, incorporated into a messaging system or social networking system, or in communication with a messaging system or social networking system.

Figure 7:
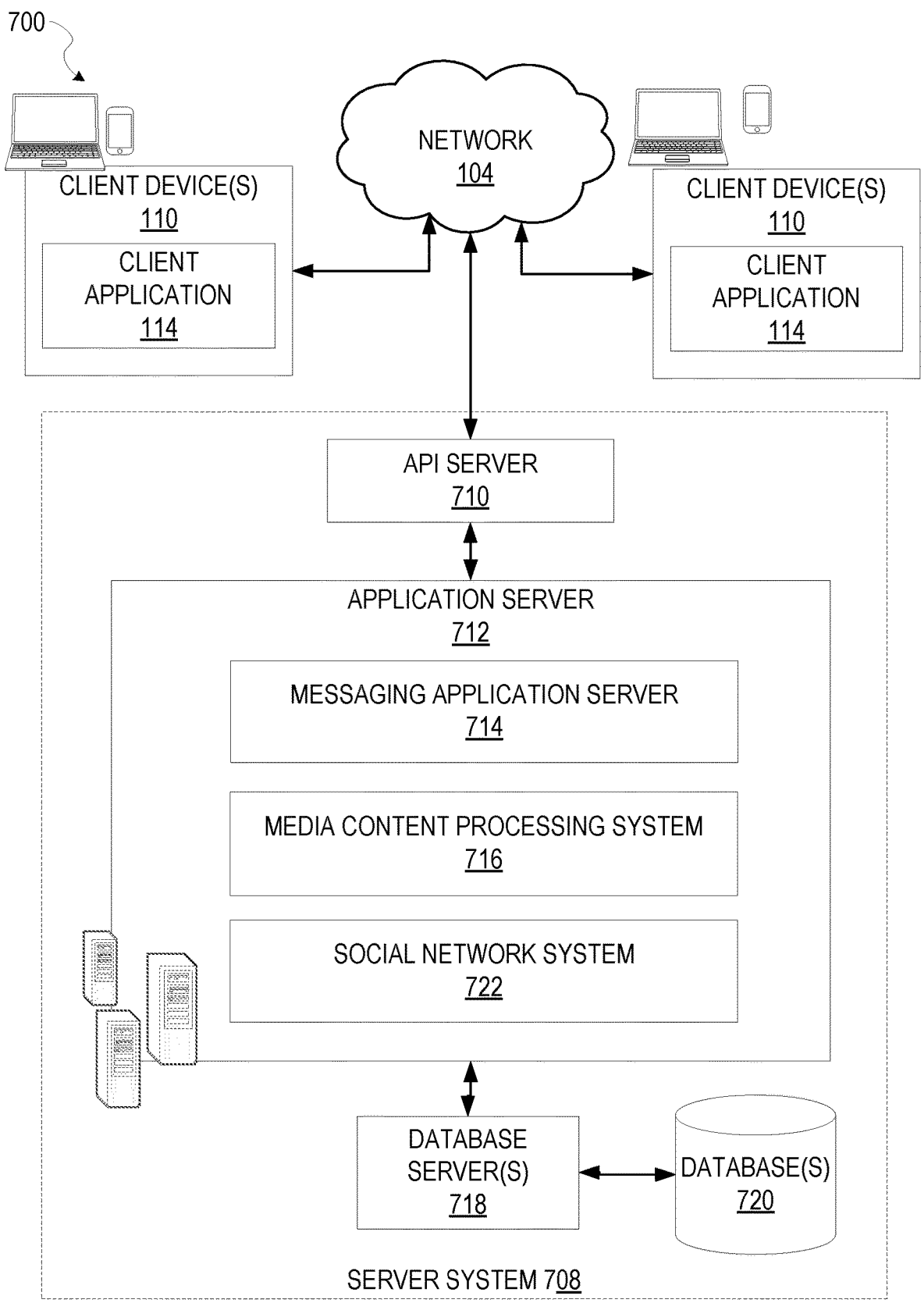
FIG. 7 is a block diagram showing an example messaging system for exchanging data (e.g., messages and associated content) over a network, according to some example embodiments.

FIG. 7 is a block diagram illustrating a networked system 700 (e.g., a messaging system) for exchanging data (e.g., messages and associated content) over a network. The networked system 700 includes multiple client devices 110, each of which hosts a number of client applications 114. Each client application 114 is communicatively coupled to other instances of the client application 114 and a server system 708 via a network 104.

The client device 110, client application 114, and network 104, are described above with respect to FIG. 1. The client device 110 may be a device of a user that is used to create media content items such as video, images (e.g., photographs), audio, and send and receive messages containing such media content items to and from other users.

In one example, a client application 114 may be a messaging application that allows a user to take a photograph or video, add a caption, or otherwise edit the photograph or video, and then send the photograph or video to another user. The message may be ephemeral and be removed from a receiving user device after viewing or after a predetermined amount of time (e.g., 10 seconds, 24 hours, etc.). An ephemeral message refers to a message that is accessible for a time-limited duration. An ephemeral message may be a text, an image, a video and other such content that may be stitched together in accordance with embodiments described herein. The access time for the ephemeral message may be set by the message sender. Alternatively, the access time may be a default setting or a setting specified by the recipient. Regardless of the setting technique, the message is transitory.

The messaging application may further allow a user to create a gallery or message collection. A gallery may be a collection of photos and videos which may be viewed by other users "following" the user's gallery (e.g., subscribed to view and receive updates in the user's gallery). The gallery may also be ephemeral (e.g., lasting 24 hours, lasting for a duration of an event (e.g., during a music concert, sporting event, etc.), or other predetermined time).

An ephemeral message may be associated with a message duration parameter, the value of which determines an amount of time that the ephemeral message will be displayed to a receiving user of the ephemeral message by the client application 114. The ephemeral message may be further associated with a message receiver identifier and a message timer. The message timer may be responsible for determining the amount of time the ephemeral message is shown to a particular receiving user identified by the message receiver identifier. For example, the ephemeral message may only be shown to the relevant receiving user for a time period determined by the value of the message duration parameter.

In another example, the messaging application may allow a user to store photographs and videos and create a gallery that is not ephemeral and that can be sent to other users; for example, to assemble photographs and videos from a recent vacation to share with friends and family.

A server system 708 may provide server-side functionality via the network 104 (e.g., the Internet or wide area network (WAN)) to one or more client device 110. The server system 708 may include an application programming interface (API) server 710, an application server 712, a messaging application server 714, a media content processing system 716, and a social network system 722, which may each be communicatively coupled with each other and with one or more data storage(s), such as database(s) 720. The server system 708 may also comprise the server system 102 of FIG. 1 or at least the LAL modeling server 124 of FIG. 1.

The server system 708 may be a cloud computing environment, according to some example embodiments. The server system 708, and any servers associated with the server system 708, may be associated with a cloud-based application, in one example embodiment. The one or more database(s) 720 may be storage devices that store information such as untreated media content, original media content from users (e.g., high-quality media content), processed media content (e.g., media content that is formatted for sharing with client devices 110 and viewing on client devices 110), context data related to a media content item, user information, user device information, LAL data, and so forth. The one or more database(s) 720 may include cloud-based storage external to the server system 708 (e.g., hosted by one or more third party entities external to the server system 708). While the storage devices are shown as database(s) 720, it is understood that the system 100 may access and store data in storage devices such as databases 720, blob storages, and other type of storage methods.

Accordingly, each client application 114 is able to communicate and exchange data with other client applications 114 and with the server system 708 via the network 104. The data exchanged between client applications 114, and between a client application 114 and the server system 708, includes functions (e.g., commands to invoke functions) as well as payload data (e.g., text, audio, video or other multimedia data).

The server system 708 provides server-side functionality via the network 104 to a particular client application 114. While certain functions of the system 700 are described herein as being performed by either a client application 114 or by the server system 708, it will be appreciated that the location of certain functionality either within the client application 114 or the server system 708 is a design choice. For example, it may be technically preferable to initially deploy certain technology and functionality within the server system 708, but to later migrate this technology and functionality to the client application 114 where a client device 110 has a sufficient processing capacity.

The server system 708 supports various services and operations that are provided to the client application 114. Such operations include transmitting data to, receiving data from, and processing data generated by the client application 114. This data may include message content, client device information, geolocation information, media annotation and overlays, message content persistence conditions, social network information, live event information, date and time stamps, as examples. Data exchanges within the networked system 700 are invoked and controlled through functions available via user interfaces (UIs) of the client application 114.

In the server system 708, an application program interface (API) server 710 is coupled to, and provides a programmatic interface to, an application server 712. The application server 712 is communicatively coupled to a database server 718, which facilitates access to one or more database(s) 720 in which is stored data associated with messages processed by the application server 712.

The API server 710 receives and transmits message data (e.g., commands and message payloads) between the client device 110 and the application server 712. Specifically, the API server 710 provides a set of interfaces (e.g., routines and protocols) that can be called or queried by the client application 114 in order to invoke functionality of the application server 712. The API server 710 exposes various functions supported by the application server 712, including account registration; login functionality; the sending of messages, via the application server 712, from a particular client application 114 to another client application 114; the sending of media files (e.g., images or video) from a client application 114 to the messaging application server 714, and for possible access by another client application 114; the setting of a collection of media data (e.g., a story); the retrieval of a list of friends of a user of a client device 110; the retrieval of such collections; the retrieval of messages and content; the adding and deletion of friends to a social graph, the location of friends within a social graph; opening an application event (e.g., relating to the client application 114), and so forth.

The application server 712 hosts a number of applications and subsystems, including a messaging application server 714, a media content processing system 716, and a social network system 722. The messaging application server 714 implements a number of message processing technologies and functions, particularly related to the aggregation and other processing of content (e.g., textual and multimedia content) included in messages received from multiple instances of the messaging client application 114. As will be described in further detail, the text and media content from multiple sources may be aggregated into collections of content (e.g., called stories or galleries). These collections are then made available, by the messaging application server 714, to the client application 114. Other processor- and memory-intensive processing of data may also be performed server-side by the messaging application server 714, in view of the hardware requirements for such processing.

The application server 712 also includes a media content processing system 716 that is dedicated to performing various media content processing operations, typically with respect to images or video received within the payload of a message at the messaging application server 714. The media content processing system 716 may access one or more data storages (e.g., database(s) 720) to retrieve stored data to use in processing media content and to store results of processed media content.

The social network system 722 supports various social networking functions and services, and makes these functions and services available to the messaging application server 714. To this end, the social network system 722 maintains and accesses an entity graph 904 (depicted in FIG. 9) within the database 720. Examples of functions and services supported by the social network system 722 include the identification of other users of the networked system 700 with which a particular user has relationships or is "following," and also the identification of other entities and interests of a particular user.

The messaging application server 714 may be responsible for generation and delivery of messages between users of client devices 110. The messaging application server 714 may utilize any one of a number of message delivery networks and platforms to deliver messages to users. For example, the messaging application server 714 may deliver messages using electronic mail (e-mail), instant message (IM), Short Message Service (SMS), text, facsimile, or voice (e.g., Voice over IP (VoIP)) messages via wired networks (e.g., the Internet), plain old telephone service (POTS), or wireless networks (e.g., mobile, cellular, WiFi, Long Term Evolution (LTE), Bluetooth).

Figure 8:
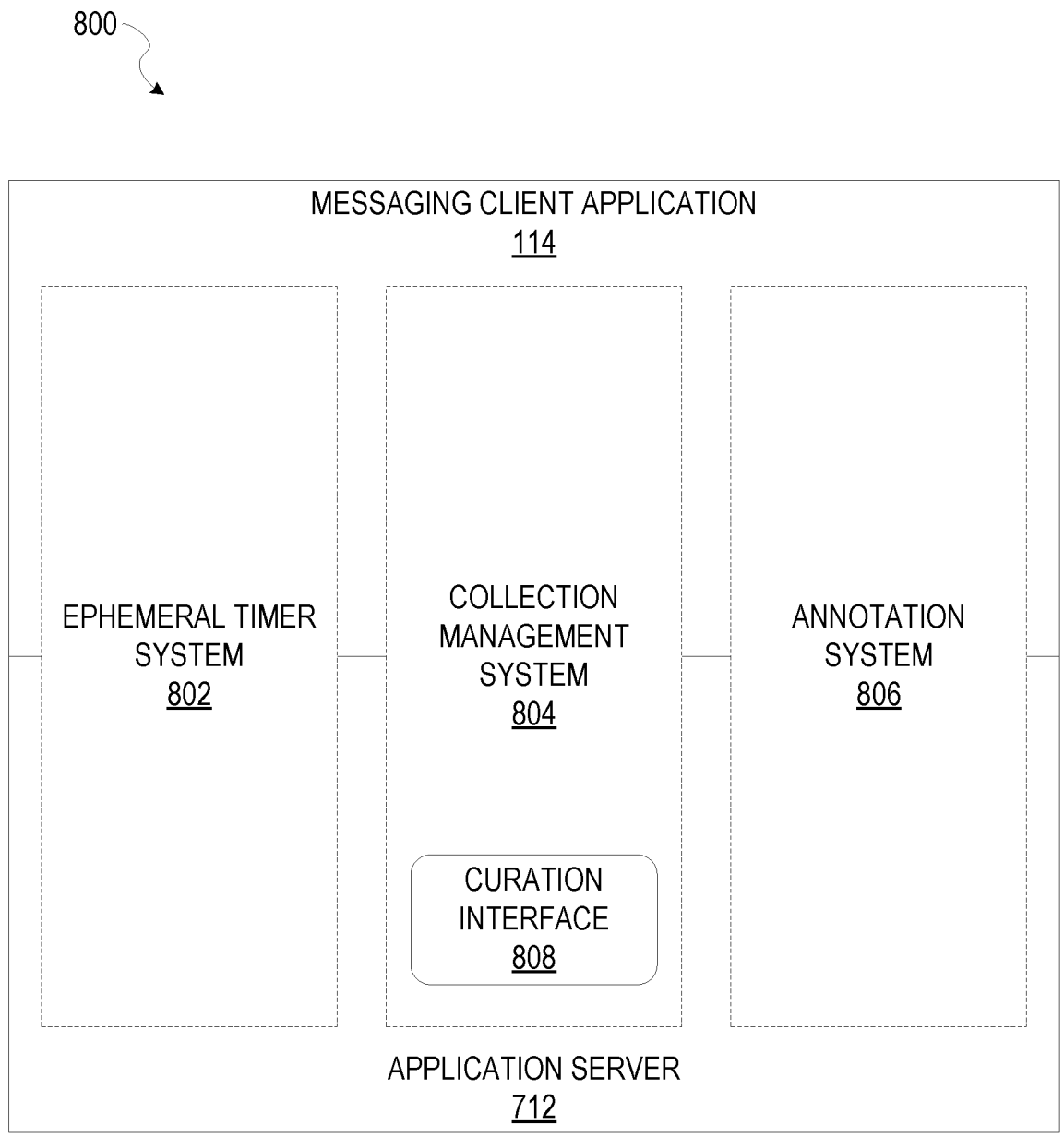
FIG. 8 is block diagram illustrating further details regarding a messaging system, according to some example embodiments.

FIG. 8 is block diagram 800 illustrating further details regarding the system 700, according to example embodiments. Specifically, the system 700 is shown to comprise the messaging client application 114 and the application server 712, which in turn embody a number of subsystems, namely an ephemeral timer system 802, a collection management system 804, and an annotation system 806.

The ephemeral timer system 802 is responsible for enforcing the temporary access to content permitted by the messaging client application 114 and the messaging application server 714. To this end, the ephemeral timer system 802 incorporates a number of timers that, based on duration and display parameters associated with a message, or collection of messages (e.g., a SNAP or SNAPCHAT Story), selectively display and enable access to messages and associated content via the messaging client application 114.

The collection management system 804 is responsible for managing collections of media (e.g., collections of text, image video and audio data). In some examples, a collection of content (e.g., messages, including images, video, text and audio) may be organized into an "event gallery" or an "event story." Such a collection may be made available for a specified time period, such as the duration of an event to which the content relates. For example, content relating to a music concert may be made available as a "Story" for the duration of that music concert. The collection management system 804 may also be responsible for publishing an icon that provides notification of the existence of a particular collection to the user interface of the messaging client application 114.

The collection management system 804 furthermore includes a curation interface 808 that allows a collection manager to manage and curate a particular collection of content. For example, the curation interface 808 enables an event organizer to curate a collection of content relating to a specific event (e.g., delete inappropriate content or redundant messages). Additionally, the collection management system 804 employs machine vision (or image recognition technology) and content rules to automatically curate a content collection. In certain embodiments, compensation (e.g., money, non-money credits or points associated with the communication system or a third party reward system, travel miles, access to artwork or specialized lenses, etcetera) may be paid to a user for inclusion of user-generated content into a collection. In such cases, the curation interface 808 operates to automatically make payments to such users for the use of their content.

The annotation system 806 provides various functions that enable a user to annotate or otherwise modify or edit media content associated with a message. For example, the annotation system 806 provides functions related to the generation and publishing of media overlays for messages processed by the networked system 700. The annotation system 806 operatively supplies a media overlay (e.g., a SNAPCHAT filter) to the messaging client application 114 based on a geolocation of the client device 110. In another example, the annotation system 806 operatively supplies a media overlay to the messaging client application 114 based on other information, such as social network information of the user of the client device 110. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 110. For example, the media overlay including text that can be overlaid on top of a photograph taken by the client device 110. In another example, the media overlay includes an identification of a location overlay (e.g., Venice beach), a name of a live event, or a name of a merchant overlay (e.g., Beach Coffee House). In another example, the annotation system 806 uses the geolocation of the client device 110 to identify a media overlay that includes the name of a merchant at the geolocation of the client device 110. The media overlay may include other indicia associated with the merchant. The media overlays may be stored in the database 720 and accessed through the database server 718.

In one example embodiment, the annotation system 806 provides a user-based publication platform that enables users to select a geolocation on a map, and upload content associated with the selected geolocation. The user may also specify circumstances under which a particular media overlay is to be offered to other users. The annotation system 806 generates a media overlay that includes the uploaded content and associates the uploaded content with the selected geolocation.

Figure 9:
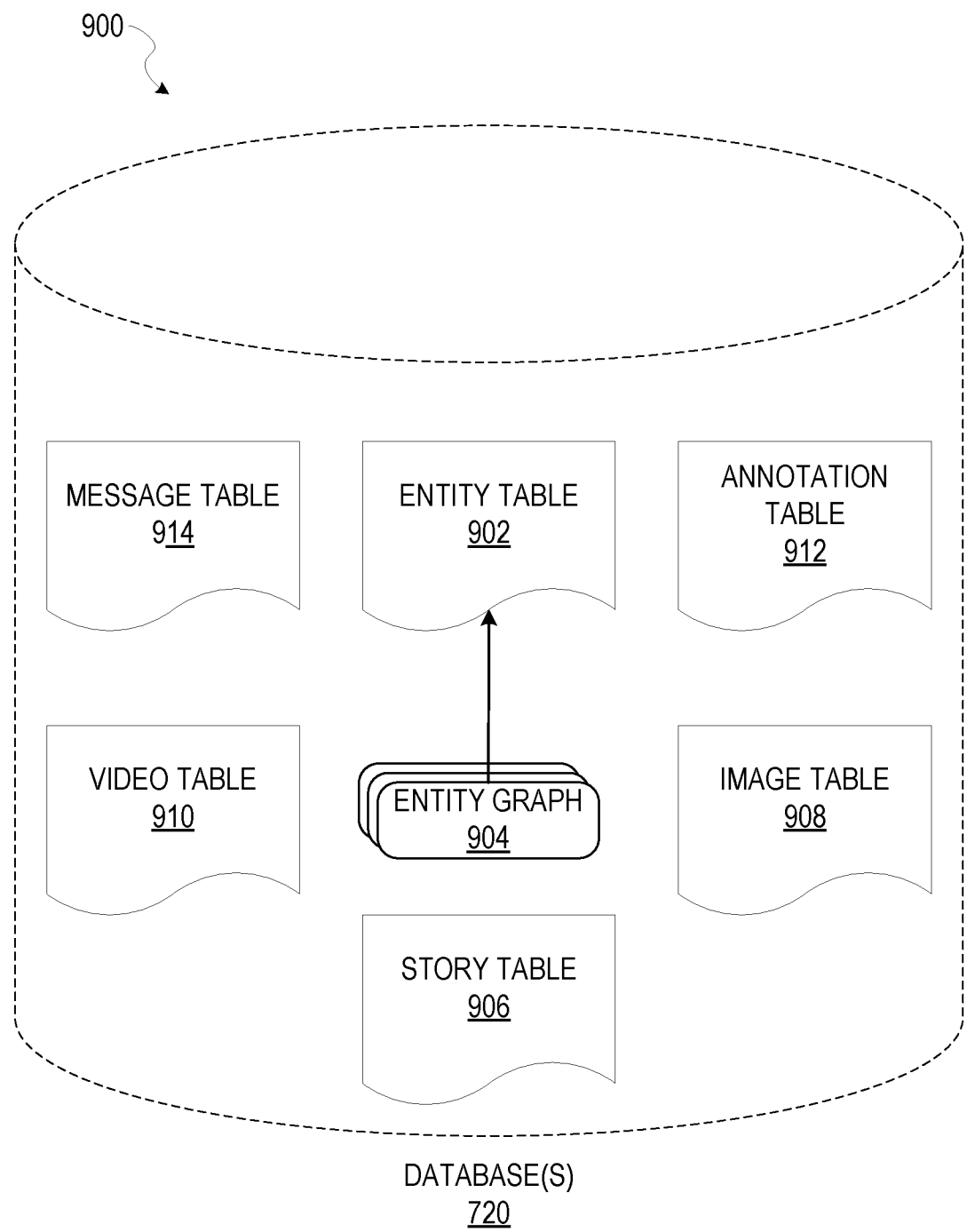
FIG. 9 is a schematic diagram illustrating data which may be stored in the database of the messaging server system, according to some example embodiments.

In another example embodiment, the annotation system 806 provides a merchant-based publication platform that enables merchants to select a particular media overlay associated with a geolocation via a bidding process. For example, the annotation system 806 associates the media overlay of a highest bidding merchant with a corresponding geolocation for a predefined amount of time FIG. 9 is a schematic diagram 900 illustrating data which may be stored in the database(s) 720 of the server system 708, according to certain example embodiments. While the content of the database 720 is shown to comprise a number of tables, it will be appreciated that the data could be stored in other types of data structures (e.g., as an object-oriented database).

The database 720 includes message data stored within a message table 914. The entity table 902 stores entity data, including an entity graph 904. Entities for which records are maintained within the entity table 902 may include individuals, corporate entities, organizations, objects, places, events, etc. Regardless of type, any entity regarding which the server system 708 stores data may be a recognized entity. Each entity is provided with a unique identifier, as well as an entity type identifier (not shown).

The entity graph 904 furthermore stores information regarding relationships and associations between entities. Such relationships may be social, professional (e.g., work at a common corporation or organization) interested-based or activity-based, merely for example.

The database 720 also stores annotation data, in the example form of filters, in an annotation table 912. Annotation data may also be referred to herein as "creative tools." Filters for which data is stored within the annotation table 912 are associated with and applied to videos (for which data is stored in a video table 910) and/or images (for which data is stored in an image table 908). Filters, in one example, are overlays that are displayed as overlaid on an image or video during presentation to a recipient user. Filters may be of various types, including user-selected filters from a gallery of filters presented to a sending user by the messaging client application 114 when the sending user is composing a message. Other types of filers include geolocation filters (also known as geo-filters) which may be presented to a sending user based on geographic location. For example, geolocation filters specific to a neighborhood or special location may be presented within a user interface by the messaging client application 114, based on geolocation information determined by a GPS unit of the client device 110. Another type of filter is a data filter, which may be selectively presented to a sending user by the messaging client application 114, based on other inputs or information gathered by the client device 110 during the message creation process. Example of data filters include current temperature at a specific location, a current speed at which a sending user is traveling, battery life for a client device 110, or the current time.

Other annotation data that may be stored within the image table 908 is so-called "lens" data. A "lens" may be a real-time special effect and sound that may be added to an image or a video.

As mentioned above, the video table 910 stores video data which, in one embodiment, is associated with messages for which records are maintained within the message table 914. Similarly, the image table 908 stores image data associated with messages for which message data is stored in the entity table 902. The entity table 902 may associate various annotations from the annotation table 912 with various images and videos stored in the image table 908 and the video table 910.

A story table 906 stores data regarding collections of messages and associated image, video, or audio data, which are compiled into a collection (e.g., a SNAPCHAT story or a gallery). The creation of a particular collection may be initiated by a particular user (e.g., each user for which a record is maintained in the entity table 902). A user may create a "personal story" in the form of a collection of content that has been created and sent/broadcast by that user. To this end, the user interface of the messaging client application 114 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users, whose client devices 110 have location services enabled and are at a common location event at a particular time, may, for example, be presented with an option, via a user interface of the messaging client application 114, to contribute content to a particular live story. The live story may be identified to the user by the messaging client application 114, based on his or her location. The end result is a "live story" told from a community perspective.

A further type of content collection is known as a "location story", which enables a user whose client device 110 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

Figure 10:
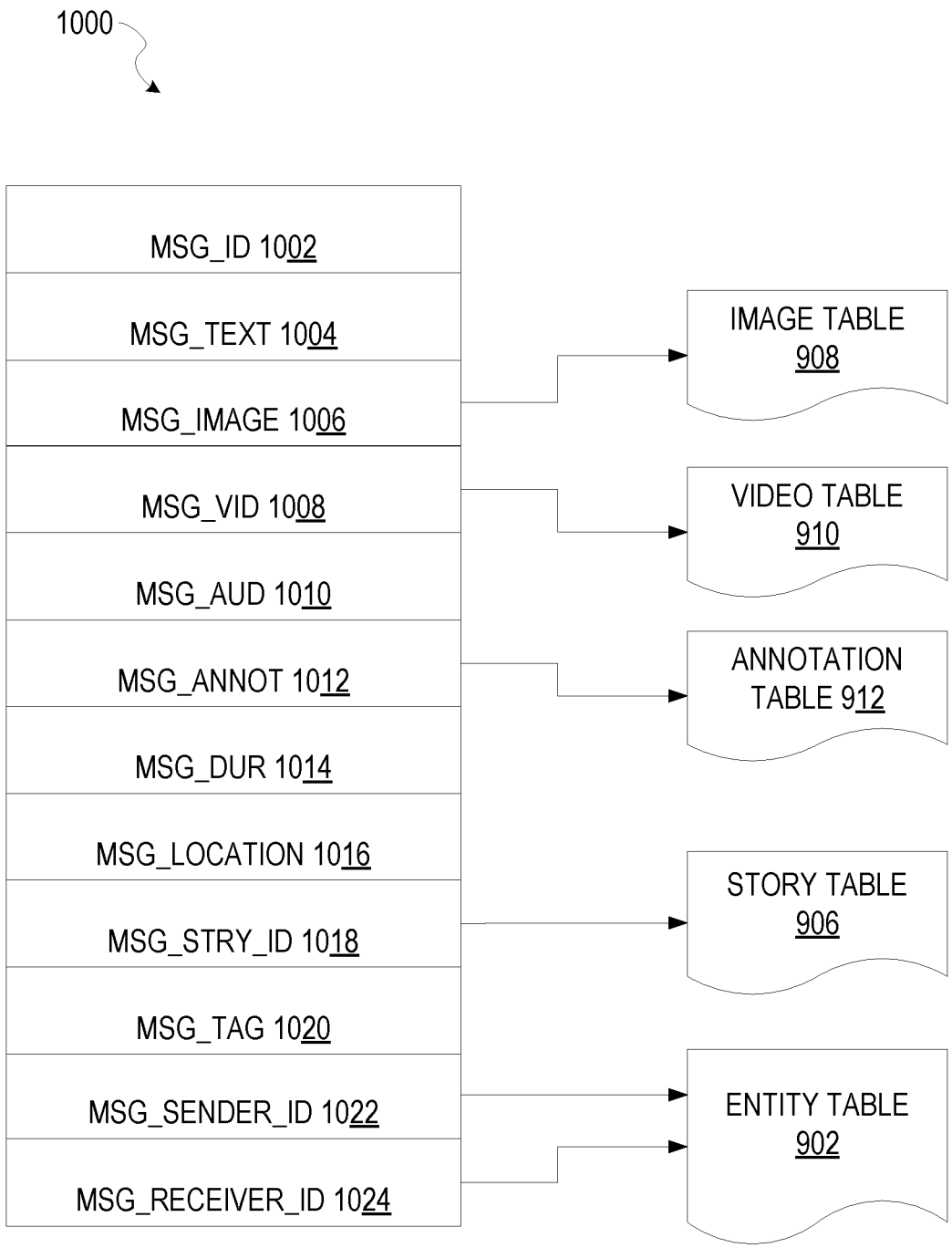
FIG. 10 is a schematic diagram illustrating a structure of a message, according to some embodiments, generated by a messaging client application for communication.

FIG. 10 is a schematic diagram illustrating a structure of a message 1000, according to some in some embodiments, generated by a client application 114 for communication to a further client application 114 or the messaging application server 714. The content of a particular message 1000 is used to populate the message table 914 stored within the database 720, accessible by the messaging application server 714. Similarly, the content of a message 1000 is stored in memory as "in-transit" or "in-flight" data of the client device 110 or the application server 712. The message 1000 is shown to include the following components:

A message identifier 1002: a unique identifier that identifies the message 1000.

A message text payload 1004: text, to be generated by a user via a user interface of the client device 110 and that is included in the message 1000.

A message image payload 1006: image data, captured by a camera component of a client device 110 or retrieved from memory of a client device 110, and that is included in the message 1000.

A message video payload 1008: video data, captured by a camera component or retrieved from a memory component of the client device 110 and that is included in the message 1000.

A message audio payload 1010: audio data, captured by a microphone or retrieved from the memory component of the client device 110, and that is included in the message 1000.

A message annotations 1012: annotation data (e.g., filters, stickers or other enhancements) that represents annotations to be applied to message image payload 1006, message video payload 1008, or message audio payload 1010 of the message 1000.

A message duration parameter 1014: parameter value indicating, in seconds, the amount of time for which content of the message 1000 (e.g., the message image payload 1006, message video payload 1008, message audio payload 1010) is to be presented or made accessible to a user via the messaging client application 114.

A message geolocation parameter 1016: geolocation data (e.g., latitudinal and longitudinal coordinates) associated with the content payload of the message 1000. Multiple message geolocation parameter 1016 values may be included in the payload, each of these parameter values being associated with respect to content items included in the content (e.g., a specific image within the message image payload 1006, or a specific video in the message video payload 1008).

A message story identifier 1018: identifier values identifying one or more content collections (e.g., "stories") with which a particular content item in the message image payload 1006 of the message 1000 is associated. For example, multiple images within the message image payload 1006 may each be associated with multiple content collections using identifier values.

A message tag 1020: each message 1000 may be tagged with multiple tags, each of which is indicative of the subject matter of content included in the message payload. For example, where a particular image included in the message image payload 1006 depicts an animal (e.g., a lion), a tag value may be included within the message tag 1020 that is indicative of the relevant animal. Tag values may be generated manually, based on user input, or may be automatically generated using, for example, image recognition.

A message sender identifier 1022: an identifier (e.g., a messaging system identifier, email address, or device identifier) indicative of a user of the client device 110 on which the message 1000 was generated and from which the message 1000 was sent.

A message receiver identifier 1024: an identifier (e.g., a messaging system identifier, email address, or device identifier) indicative of a user of the client device 110 to which the message 1000 is addressed.

The contents (e.g., values) of the various components of message 1000 may be pointers to locations in tables within which content data values are stored. For example, an image value in the message image payload 1006 may be a pointer to (or address of) a location within an image table 908. Similarly, values within the message video payload 1008 may point to data stored within a video table 910, values stored within the message annotations 1012 may point to data stored in an annotation table 912, values stored within the message story identifier 1018 may point to data stored in a story table 906, and values stored within the message sender identifier 1022 and the message receiver identifier 1024 may point to user records stored within an entity table 902.

The following examples describe various embodiments of methods, machine-readable media, and systems (e.g., machines, devices, or other apparatus) discussed herein.

Example 1

A method comprising:
receiving, at a server computer system, a request for lookalike data, the request for lookalike data comprising seed data;
generating, by the server computer system, sample data from the seed data and from user data for a plurality of users, to use in a lookalike model training;
capturing, by the server computer system, a snapshot of social graph data for a plurality of users and computing social graph features based on the seed data and the user data for the plurality of users;
training, by the server computer system, a lookalike model based on the sample data, user profile features for the plurality of users, and the computed social graph features to generate a trained lookalike model;
generating, by the server computer system, a lookalike score for each user of the plurality of users in the user data using the trained lookalike model; and
generating, by the server computer system, a list comprising a unique identifier for each user of the plurality of users and an associated lookalike score for each unique identifier.

Example 2

A method according to Example 1, wherein generating the sample data, from the seed data and from the user data for the plurality of users, to use in the lookalike model training, comprises:
generating a positive data sample from the seed data to use in the lookalike model training; and
generating a negative data sample from user data stored in a database to use in the lookalike model training;

Example 3

A method according to any of the previous examples, wherein the positive data sample comprises the seed data.

Example 4

A method according to any of the previous examples, wherein the negative data sample comprises a subset of the user data for the plurality of users.

Example 5

A method according to any of the previous examples, further comprising:
capturing a user profile snapshot;
generating user profile feature data; and
storing the user profile feature data.

Example 6

A method according to any of the previous examples, wherein the request further comprises filter characteristics, and the method further comprises:
filtering the list comprising each user and an associated lookalike score for each user, based on the filter characteristics received in the request; and
associating the filtered list with the request.

Example 7

A method according to any of the previous examples, wherein the seed data comprises a plurality of user identifiers.

Example 8

A method according to any of the previous examples, wherein the generated list comprising a unique identifier for each user of the plurality of users, and an associated lookalike score for each unique identifier, is of a size indicated by the request for the lookalike data.

Example 9

A method according to any of the previous examples, wherein the plurality of users are users of a messaging system or social networking system.

Example 10

A method according to any of the previous examples, wherein the generated list is associated with a requester that sent the request for the lookalike data, and the method further comprises:
receiving content from the requester; and
displaying the content to one or more users of the plurality of users, based on the generated list.

Example 11

A server computer comprising:
one or more hardware processors; and
a computer-readable medium coupled with the one or more hardware processors, the computer-readable medium comprising instructions stored thereon that are executable by the one or more hardware processors to cause the server computer to perform operations comprising:
receiving a request for lookalike data, the request for lookalike data comprising seed data;
generating sample data from the seed data and from user data for a plurality of users, to use in a lookalike model training;
capturing a snapshot of social graph data for a plurality of users and computing social graph features based on the seed data and the user data for the plurality of users;
training a lookalike model based on the sample data, user profile features for the plurality of users, and the computed social graph features to generate a trained lookalike model;
generating a lookalike score for each user of the plurality of users in the user data using the trained lookalike model; and generating a list comprising a unique identifier for each user of the plurality of users and an associated lookalike score for each unique identifier.

Example 12

A server computer according to any of the previous examples, wherein generating the sample data, from the seed data and from the user data for the plurality of users, to use in the lookalike model training, comprises:
generating a positive data sample from the seed data to use in the lookalike model training; and
generating a negative data sample from user data stored in a database to use in the lookalike model training.

Example 13

A server computer according to any of the previous examples, wherein the positive data sample comprises the seed data.

Example 14

A server computer according to any of the previous examples, wherein the negative data sample comprises a subset of the user data for the plurality of users.

Example 15

A server computer according to any of the previous examples, the operations further comprising:
capturing a user profile snapshot;
generating user profile feature data; and
storing the user profile feature data.

Example 16

A server computer according to any of the previous examples, wherein the request further comprises filter characteristics, and the operations further comprise:
filtering the list comprising each user and an associated lookalike score for each user, based on the filter characteristics received in the request; and
associating the filtered list with the request.

Example 17

A server computer according to any of the previous examples, wherein the generated list comprising a unique identifier for each user of the plurality of users, and an associated lookalike score for each unique identifier, is of a size indicated by the request for the lookalike data.

Example 18

A server computer according to any of the previous examples, wherein the plurality of users are users of a messaging system or social networking system.

Example 19

A server computer according to any of the previous examples, wherein the generated list is associated with a requester that sent the request for the lookalike data, and the operations further comprise:

receiving content from the requester; and
displaying the content to one or more users of the plurality of users, based on the generated list.

Example 20

A non-transitory computer-readable medium comprising instructions stored thereon that are executable by at least one processor to cause a computing device to perform operations comprising:
receiving a request for lookalike data, the request for lookalike data comprising seed data;
generating sample data from the seed data and from user data for a plurality of users, to use in a lookalike model training;
capturing a snapshot of social graph data for a plurality of users and computing social graph features based on the seed data and the user data for the plurality of users;
training a lookalike model based on the sample data, user profile features for the plurality of users, and the computed social graph features to generate a trained lookalike model;
generating a lookalike score for each user of the plurality of users in the user data using the trained lookalike model; and
generating a list comprising a unique identifier for each user of the plurality of users and an associated lookalike score for each unique identifier.

Figure 11:
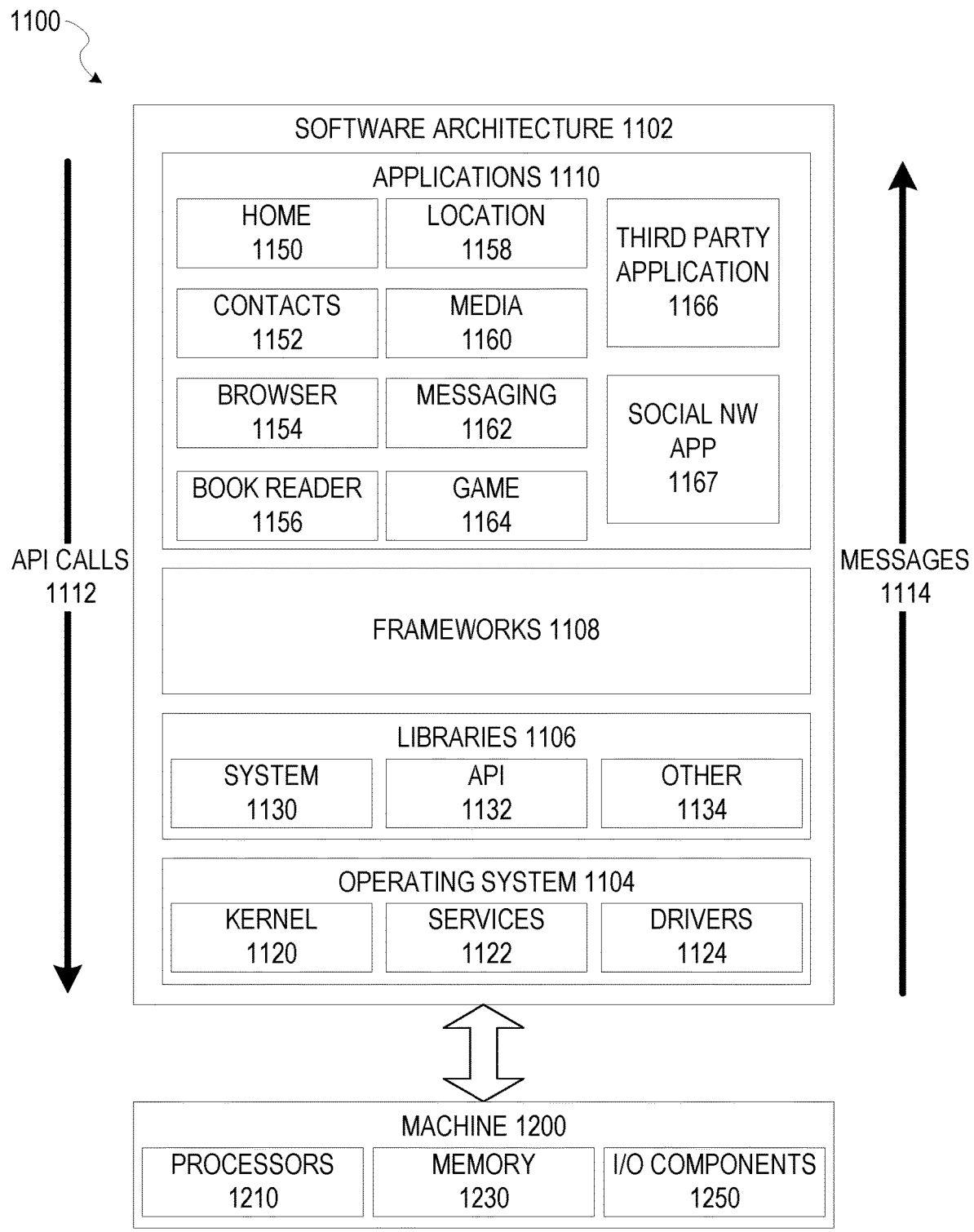
FIG. 11 is a block diagram illustrating an example of a software architecture that may be installed on a machine, according to some example embodiments.

FIG. 11 is a block diagram 1100 illustrating software architecture 1102, which can be installed on any one or more of the devices described above. For example, in various embodiments, client devices 110 and server systems 102, 120, 122, 124, 130, 708, 710, 712, 714, 716, 722 may be implemented using some or all of the elements of software architecture 1102. FIG. 11 is merely a non-limiting example of a software architecture, and it will be appreciated that many other architectures can be implemented to facilitate the functionality described herein. In various embodiments, the software architecture 1102 is implemented by hardware such as machine 1200 of FIG. 12 that includes processors 1210, memory 1230, and I/O components 1250. In this example, the software architecture 1102 can be conceptualized as a stack of layers where each layer may provide a particular functionality. For example, the software architecture 1102 includes layers such as an operating system 1104, libraries 1106, frameworks 1108, and applications 1110. Operationally, the applications 1110 invoke API calls 1112 through the software stack and receive messages 1114 in response to the API calls 1112, consistent with some embodiments.

In various implementations, the operating system 1104 manages hardware resources and provides common services. The operating system 1104 includes, for example, a kernel 1120, services 1122, and drivers 1124. The kernel 1120 acts as an abstraction layer between the hardware and the other software layers, consistent with some embodiments. For example, the kernel 1120 provides memory management, processor management (e.g., scheduling), component management, networking, and security settings, among other functionality. The services 1122 can provide other common services for the other software layers. The drivers 1124 are responsible for controlling or interfacing with the underlying hardware, according to some embodiments. For instance, the drivers 1124 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

In some embodiments, the libraries 1106 provide a low-level common infrastructure utilized by the applications 1110. The libraries 1106 can include system libraries 1130 (e.g., C standard library) that can provide functions such as memory allocation functions, string manipulation functions, mathematic functions, and the like. In addition, the libraries 1106 can include API libraries 1132 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and in three dimensions (3D) graphic content on a display), database libraries (e.g., SQLite to provide various relational database functions), web libraries (e.g., WebKit to provide web browsing functionality), and the like. The libraries 1106 can also include a wide variety of other libraries 1134 to provide many other APIs to the applications 1110.

The frameworks 1108 provide a high-level common infrastructure that can be utilized by the applications 1110, according to some embodiments. For example, the frameworks 1108 provide various graphic user interface (GUI) functions, high-level resource management, high-level location services, and so forth. The frameworks 1108 can provide a broad spectrum of other APIs that can be utilized by the applications 1110, some of which may be specific to a particular operating system 1104 or platform.

In an example embodiment, the applications 1110 include a home application 1150, a contacts application 1152, a browser application 1154, a book reader application 1156, a location application 1158, a media application 1160, a messaging application 1162, a game application 1164, and a broad assortment of other applications such as a third party applications 1166. According to some embodiments, the applications 1110 are programs that execute functions defined in the programs. Various programming languages can be employed to create one or more of the applications 1110, structured in a variety of manners, such as object-oriented programming languages (e.g., Objective-C, Java, or C++) or procedural programming languages (e.g., C or assembly language). In a specific example, the third party application 1166 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third party application 1166 can invoke the API calls 1112 provided by the operating system 1104 to facilitate functionality described herein.

Some embodiments may particularly include a social networking application 1167. In certain embodiments, this may be a stand-alone application that operates to manage communications with a server system such as third party servers 130 or server system 102 or 708. In other embodiments, this functionality may be integrated with another application. The social networking application 1167 may request and display various data related to messaging, media content, media collections, and so forth, and may provide the capability for a user 106 to input data related to the system via a touch interface, keyboard, or using a camera device of machine 1200, communication with a server system via I/O components 1250, and receipt and storage of object data in memory 1230. Presentation of information and user inputs associated with the information may be managed by social networking application 1167 using different frameworks 1108, library 1106 elements, or operating system 1104 elements operating on a machine 1200.

Figure 12:
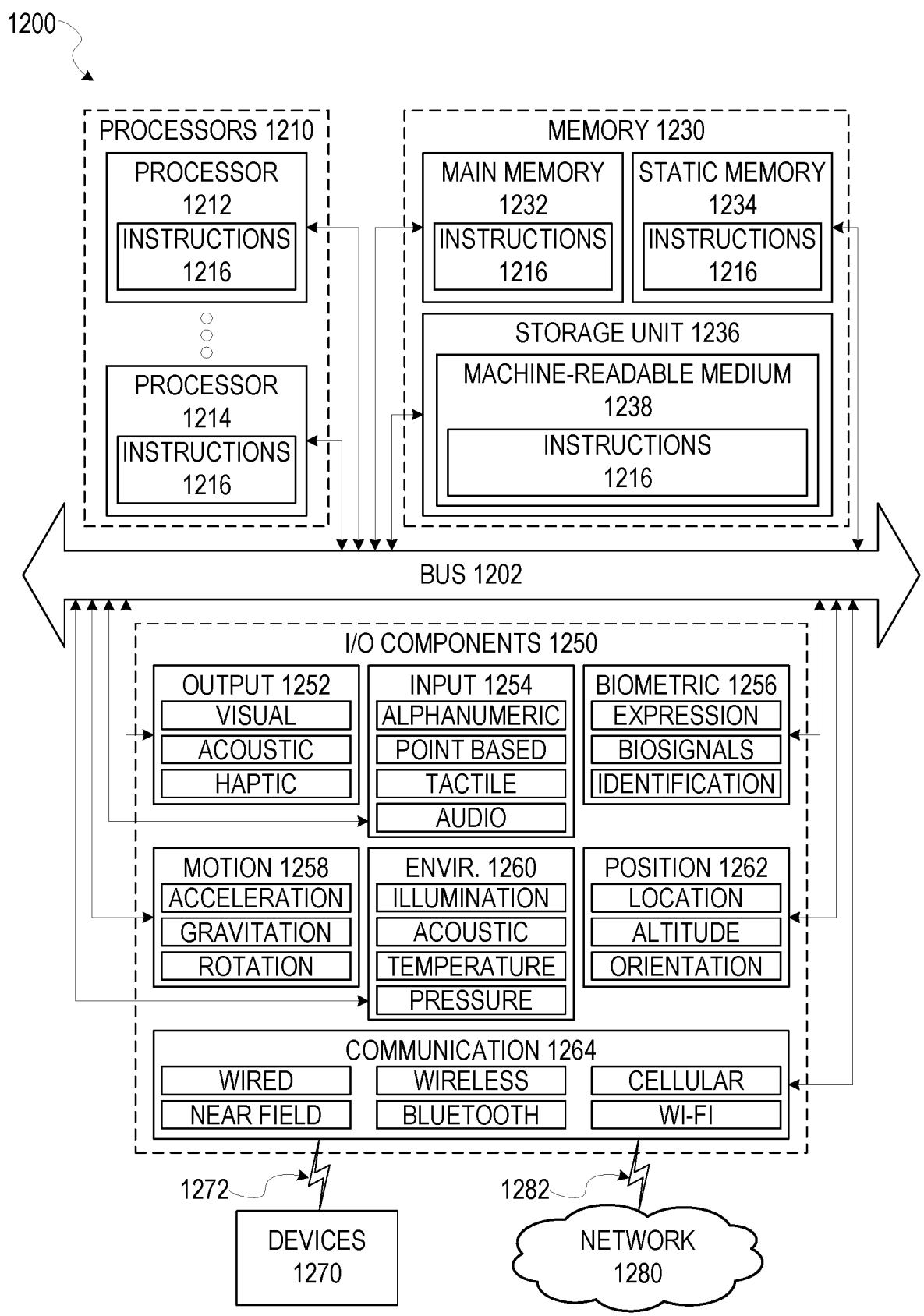
FIG. 12 illustrates a diagrammatic representation of a machine, in the form of a computer system, within which a set of instructions may be executed for causing the machine to perform any one or more of the methodologies discussed herein, according to an example embodiment.

FIG. 12 is a block diagram illustrating components of a machine 1200, according to some embodiments, able to read instructions from a machine-readable medium (e.g., a machine-readable storage medium) and perform any one or more of the methodologies discussed herein. Specifically, FIG. 12 shows a diagrammatic representation of the machine 1200 in the example form of a computer system, within which instructions 1216 (e.g., software, a program, an application, an applet, an app, or other executable code) for causing the machine 1200 to perform any one or more of the methodologies discussed herein can be executed. In alternative embodiments, the machine 1200 operates as a standalone device or can be coupled (e.g., networked) to other machines. In a networked deployment, the machine 1200 may operate in the capacity of a server machine 102, 120, 122, 124, 130, 708, 710, 712, 714, 716, 722, and the like, or a client device 110 in a server-client network environment, or as a peer machine in a peer-to-peer (or distributed) network environment. The machine 1200 can comprise, but not be limited to, a server computer, a client computer, a personal computer (PC), a tablet computer, a laptop computer, a netbook, a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1216, sequentially or otherwise, that specify actions to be taken by the machine 1200. Further, while only a single machine 1200 is illustrated, the term "machine" shall also be taken to include a collection of machines 1200 that individually or jointly execute the instructions 1216 to perform any one or more of the methodologies discussed herein.

In various embodiments, the machine 1200 comprises processors 1210, memory 1230, and I/O components 1250, which can be configured to communicate with each other via a bus 1202. In an example embodiment, the processors 1210 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) include, for example, a processor 1212 and a processor 1214 that may execute the instructions 1216. The term "processor" is intended to include multi-core processors 1210 that may comprise two or more independent processors 1212, 1214 (also referred to as "cores") that can execute instructions 1216 contemporaneously. Although FIG. 12 shows multiple processors 1210, the machine 1200 may include a single processor 1210 with a single core, a single processor 1210 with multiple cores (e.g., a multi-core processor 1210), multiple processors 1212, 1214 with a single core, multiple processors 1212, 1214 with multiples cores, or any combination thereof.

The memory 1230 comprises a main memory 1232, a static memory 1234, and a storage unit 1236 accessible to the processors 1210 via the bus 1202, according to some embodiments. The storage unit 1236 can include a machine-readable medium 1238 on which are stored the instructions 1216 embodying any one or more of the methodologies or functions described herein. The instructions 1216 can also reside, completely or at least partially, within the main memory 1232, within the static memory 1234, within at least one of the processors 1210 (e.g., within the processor's cache memory), or any suitable combination thereof, during execution thereof by the machine 1200. Accordingly, in various embodiments, the main memory 1232, the static memory 1234, and the processors 1210 are considered machine-readable media 1238.

As used herein, the term "memory" refers to a machine-readable medium 1238 able to store data temporarily or permanently and may be taken to include, but not be limited to, random-access memory (RAM), read-only memory (ROM), buffer memory, flash memory, and cache memory. While the machine-readable medium 1238 is shown, in an example embodiment, to be a single medium, the term "machine-readable medium" should be taken to include a single medium or multiple media (e.g., a centralized or distributed database, or associated caches and servers) able to store the instructions 1216. The term "machine-readable medium" shall also be taken to include any medium, or combination of multiple media, that is capable of storing instructions (e.g., instructions 1216) for execution by a machine (e.g., machine 1200), such that the instructions 1216, when executed by one or more processors of the machine 1200 (e.g., processors 1210), cause the machine 1200 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 1250 include a wide variety of components to receive input, provide output, produce output, transmit information, exchange information, capture measurements, and so on. In general, it will be appreciated that the I/O components 1250 can include many other components that are not shown in FIG. 12. The I/O components 1250 are grouped according to functionality merely for simplifying the following discussion, and the grouping is in no way limiting. In various example embodiments, the I/O components 1250 include output components 1252 and input components 1254. The output components 1252 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 1254 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 1250 include biometric components 1256, motion components 1258, environmental components 1260, or position components 1262, among a wide array of other components. For example, the biometric components 1256 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1258 include acceleration sensor components (e.g., accelerometer), gravitation sensor components, rotation sensor components (e.g., gyroscope), and so forth. The environmental components 1260 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 1262 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 1250 may include communication components 1264 operable to couple the machine 1200 to a network 1280 or devices 1270 via a coupling 1282 and a coupling 1272, respectively. For example, the communication components 1264 include a network interface component or another suitable device to interface with the network 1280. In further examples, communication components 1264 include wired communication components, wireless communication components, cellular communication components, near field communication (NFC) components, BLUETOOTH® components (e.g., BLUETOOTH® Low Energy), WI-FI® components, and other communication components to provide communication via other modalities. The devices 1270 may be another machine 1200 or any of a wide variety of peripheral devices (e.g., a peripheral device coupled via a Universal Serial Bus (USB)).

Moreover, in some embodiments, the communication components 1264 detect identifiers or include components operable to detect identifiers. For example, the communication components 1264 include radio frequency identification (RFID) tag reader components, NFC smart tag detection components, optical reader components (e.g., an optical sensor to detect a one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 1264, such as location via Internet Protocol (IP) geo-location, location via WI-FI® signal triangulation, location via detecting a BLU-ETOOTH® or NFC beacon signal that may indicate a particular location, and so forth.

In various example embodiments, one or more portions of the network 1280 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a WI-FI® network, another type of network, or a combination of two or more such networks. For example, the network 1280 or a portion of the network 1280 may include a wireless or cellular network, and the coupling 1282 may be a Code Division Multiple Access (CDMA) connection, a Global System for Mobile communications (GSM) connection, or another type of cellular or wireless coupling. In this example, the coupling 1282 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 1216 are transmitted or received over the network 1280 using a transmission medium via a network interface device (e.g., a network interface component included in the communication components 1264) and utilizing any one of a number of well-known transfer protocols (e.g., Hypertext Transfer Protocol (HTTP)). Similarly, in other example embodiments, the instructions 1216 are transmitted or received using a transmission medium via the coupling 1272 (e.g., a peer-to-peer coupling) to the devices 1270. The term "transmission medium" shall be taken to include any intangible medium that is capable of storing, encoding, or carrying the instructions 1216 for execution by the machine 1200, and includes digital or analog communications signals or other intangible media to facilitate communication of such software.

Furthermore, the machine-readable medium 1238 is non-transitory (in other words, not having any transitory signals) in that it does not embody a propagating signal. However, labeling the machine-readable medium 1238 "non-transitory" should not be construed to mean that the medium is incapable of movement; the medium 1238 should be considered as being transportable from one physical location to another. Additionally, since the machine-readable medium 1238 is tangible, the medium 1238 may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
receiving, at a server computer system, a request for lookalike data, the request for lookalike data comprising seed data;
generating, by the server computer system, sample data from the seed data and from user data for a plurality of users, to use in a lookalike model training, by performing operations comprising:
generating a positive data sample from the seed data to use in the lookalike model training; and
generating a negative data sample from user data stored in a database to use in the lookalike model training;
capturing, by the server computer system, a snapshot of social graph data for the plurality of users and computing social graph features based on the seed data and the user data for the plurality of users;
training, by the server computer system, a lookalike model based on the sample data, user profile features for the plurality of users, and the computed social graph features to generate a trained lookalike model;
generating, by the server computer system, a lookalike score for each user of the plurality of users in the user data using the trained lookalike model; and generating, by the server computer system, a list comprising a unique identifier for each user of the plurality of users and an associated lookalike score for each unique identifier.

2. The method of claim 1, wherein the positive data sample comprises the seed data.

3. The method of claim 1, wherein the negative data sample comprises a subset of the user data for the plurality of users.

4. The method of claim 1, further comprising:
capturing a user profile snapshot;
generating user profile feature data; and
storing the user profile feature data.

5. The method of claim 1, wherein the request further comprises filter characteristics, and the method further comprises:
filtering the list comprising each user and an associated lookalike score for each user, based on the filter characteristics received in the request; and
associating the filtered list with the request.

6. The method of claim 1, wherein the seed data comprises a plurality of user identifiers.

7. The method of claim 1, wherein the generated list comprising a unique identifier for each user of the plurality of users, and an associated lookalike score for each unique identifier, is of a size indicated by the request for the lookalike data.

8. The method of claim 1, wherein the plurality of users are users of a messaging system or social networking system.

9. The method of claim 1, wherein the generated list is associated with a requester that sent the request for the lookalike data, and the method further comprises:
receiving content from the requester; and
displaying the content to one or more users of the plurality of users, based on the generated list.

10. A server computer comprising:
one or more hardware processors; and
a computer-readable medium coupled with the one or more hardware processors, the computer-readable medium comprising instructions stored thereon that are executable by the one or more hardware processors to cause the server computer to perform operations comprising:
receiving a request for lookalike data, the request for lookalike data comprising seed data;
generating sample data from the seed data and from user data for a plurality of users, to use in a lookalike model training, by performing operations comprising:
generating a positive data sample from the seed data to use in the lookalike model training; and
generating a negative data sample from user data stored in a database to use in the lookalike model training;
capturing a snapshot of social graph data for the plurality of users and computing social graph features based on the seed data and the user data for the plurality of users;
training a lookalike model based on the sample data, user profile features for the plurality of users, and the computed social graph features to generate a trained lookalike model;
generating a lookalike score for each user of the plurality of users in the user data using the trained lookalike model; and
generating a list comprising a unique identifier for each user of the plurality of users and an associated lookalike score for each unique identifier.

11. The server computer of claim 10, wherein the positive data sample comprises the seed data.

12. The server computer of claim 10, wherein the negative data sample comprises a subset of the user data for the plurality of users.

13. The server computer of claim 10, the operations further comprising:
capturing a user profile snapshot;
generating user profile feature data; and
storing the user profile feature data.

14. The server computer of claim 10, wherein the request further comprises filter characteristics, and the operations further comprise:
filtering the list comprising each user and an associated lookalike score for each user, based on the filter characteristics received in the request; and
associating the filtered list with the request.

15. The server computer of claim 10, wherein the generated list comprising a unique identifier for each user of the plurality of users, and an associated lookalike score for each unique identifier, is of a size indicated by the request for the lookalike data.

16. The server computer of claim 10, wherein the plurality of users are users of a messaging system or social networking system.

17. The server computer of claim 10, wherein the generated list is associated with a requester that sent the request for the lookalike data, and the operations further comprise:
receiving content from the requester; and
displaying the content to one or more users of the plurality of users, based on the generated list.

18. A non-transitory computer-readable medium comprising instructions stored thereon that are executable by at least one processor to cause a computing device to perform operations comprising:
receiving a request for lookalike data, the request for lookalike data comprising seed data;
generating sample data from the seed data and from user data for a plurality of users, to use in a lookalike model training, by performing operations comprising:
generating a positive data sample from the seed data to use in the lookalike model training; and
generating a negative data sample from user data stored in a database to use in the lookalike model training;
capturing a snapshot of social graph data for the plurality of users and computing social graph features based on the seed data and the user data for the plurality of users;
training a lookalike model based on the sample data, user profile features for the plurality of users, and the computed social graph features to generate a trained lookalike model;
generating a lookalike score for each user of the plurality of users in the user data using the trained lookalike model; and
generating a list comprising a unique identifier for each user of the plurality of users and an associated lookalike score for each unique identifier.

19. The non-transitory computer-readable medium of claim 18, wherein the positive data sample comprises the seed data.

20. The non-transitory computer-readable medium of claim 18, wherein the negative data sample comprises a subset of the user data for the plurality of users.

* * * * *